(12) United States Patent
Takahashi et al.

(10) Patent No.: US 11,098,928 B2
(45) Date of Patent: Aug. 24, 2021

(54) SPEED ESTIMATION APPARATUS FOR AC MOTOR, DRIVING APPARATUS FOR AC MOTOR, REFRIGERANT COMPRESSOR, AND REFRIGERATION CYCLE APPARATUS

(71) Applicant: Mitsubishi Electric Corporation, Chiyoda-ku (JP)

(72) Inventors: Kenji Takahashi, Tokyo (JP); Koichi Arisawa, Tokyo (JP); Mitsuo Kashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 4 days.

(21) Appl. No.: 16/098,313

(22) PCT Filed: Apr. 18, 2017

(86) PCT No.: PCT/JP2017/015561
§ 371 (c)(1),
(2) Date: Nov. 1, 2018

(87) PCT Pub. No.: WO2017/212794
PCT Pub. Date: Dec. 14, 2017

(65) Prior Publication Data
US 2019/0145668 A1 May 16, 2019

(30) Foreign Application Priority Data
Jun. 8, 2016 (JP) .............................. JP2016-114609

(51) Int. Cl.
*F25B 1/04* (2006.01)
*G05B 11/38* (2006.01)
(Continued)

(52) U.S. Cl.
CPC ................ *F25B 1/04* (2013.01); *G05B 11/36* (2013.01); *G05B 11/38* (2013.01); *G05B 11/40* (2013.01); *G05B 11/42* (2013.01); *H02P 23/12* (2013.01)

(58) Field of Classification Search
CPC ........... F25B 1/04; G05B 11/38; G05B 11/42; G05B 11/40; H02P 23/12
See application file for complete search history.

(56) References Cited

U.S. PATENT DOCUMENTS

2006/0006825 A1* 1/2006 Inaguma ................. H02P 21/22
318/432
2007/0236167 A1* 10/2007 Tomigashi ............... H02P 6/18
318/721
2013/0033254 A1* 2/2013 Shinnaka ................ H02P 21/26
324/160

FOREIGN PATENT DOCUMENTS

JP   1-308184 A   12/1989
JP   2001-37281 A   2/2001
(Continued)

OTHER PUBLICATIONS

International Search Report dated Jul. 18, 2017 in PCT/JP2017/015561 filed on Apr. 18, 2017.

*Primary Examiner* — Kawing Chan
*Assistant Examiner* — Bradley R Brown
(74) *Attorney, Agent, or Firm* — Xsensus LLP

(57) ABSTRACT

A speed estimation apparatus for an AC motor includes a model deviation calculation unit, first and second angular velocity estimation units, and an adder. The deviation calculation unit calculates a model deviation based on a voltage, a current, and an estimated angular velocity of the motor. The first angular velocity estimation unit calculates a first estimated angular velocity as a low-frequency component including a DC component of a real angular velocity
(Continued)

based on the model deviation. The second angular velocity estimation unit calculates a second estimated angular velocity as a high-frequency component of a real angular velocity based on a specific high-frequency component of the model deviation. The adder adds the first and second estimated angular velocities together. An addition value of the first and second estimated angular velocities is fed back as the estimated angular velocity to the deviation calculation unit.

17 Claims, 16 Drawing Sheets

(51) Int. Cl.
*H02P 23/12* (2006.01)
*G05B 11/40* (2006.01)
*G05B 11/42* (2006.01)
*G05B 11/36* (2006.01)

(56) References Cited

FOREIGN PATENT DOCUMENTS

| JP | 2003-302413 A | 10/2003 |
|----|---------------|---------|
| JP | 4221307 B2 | 2/2009 |

\* cited by examiner

SPEED ESTIMATION APPARATUS FOR AC MOTOR, DRIVING APPARATUS FOR AC MOTOR, REFRIGERANT COMPRESSOR, AND REFRIGERATION CYCLE APPARATUS

FIELD

The present invention relates to a speed estimation apparatus which estimates the speed of an AC motor such as an induction machine or a synchronous machine, a driving apparatus for the AC motor, a refrigerant compressor, and a refrigeration cycle apparatus.

BACKGROUND

The speed of AC motors is described by an equation of motion based on generated torque and load torque, and when any one of the generated torque and the load torque vibrates, the speed becomes vibratory. Since pulsation of speed or torque causes noise or vibration, a measure for controlling the speed or the torque of AC motors with high accuracy has been demanded. In order to control the speed or the torque of an AC motor such as an induction machine or a synchronous machine with high accuracy, position information of a rotor is necessary. However, when a position sensor or a speed sensor is used, cost may increase or reliability may decrease. Therefore, a number of studies on sensorless control of AC motors have been made.

As sensorless control of an AC motor, a method using an adaptive observer has been known. A sensorless vector control method using an adaptive observer estimates a speed with high accuracy based on an induced voltage, and has an advantage that a speed estimation error can be steadily made zero. However, there is a constraint on an estimation response in the sensorless vector control method, and it is difficult to accurately estimate high-frequency speed pulsation in the sensorless vector control method. For this reason, in the sensorless vector control method, it is extremely difficult to feed back a speed estimation value to suppress high-frequency speed pulsation.

As a representative example of a load whose load torque periodically vibrates, there has been known a compressor used in a refrigeration cycle apparatus. Factors which cause periodical pulsation of generated torque of an AC motor include distortion of an induced voltage of the AC motor, offset of a current detector, gain imbalance, and an output voltage error due to a deadtime of a power converter. There is a case where controllability greatly deteriorates due to these periodic disturbance factors when driving AC motors.

Patent Literatures 1 and 2 each disclose a method for suppressing high-frequency speed pulsation or torque pulsation by feedback control. Patent Literature 3 discloses a method for suppressing high-frequency speed pulsation or torque pulsation by feedforward control.

In the control method disclosed in Patent Literature 1, a sine term coefficient and a cosine term coefficient of rotational unevenness of an arbitrary harmonic are extracted by Fourier transform, Proportional Integral Derivative (PID) control is performed so that the sine term coefficient and the cosine term coefficient become zero, and then, a compensation signal is converted into an AC form and added to a current command, thereby reducing the rotational unevenness. In Patent Literature 2, a position estimation error in sensorless control is referred to as an axial error, and in a control device disclosed in Patent Literature 2, speed pulsation is reduced by constructing a feedback loop for canceling a periodic disturbance component based on the axial error. A torque control device disclosed in Patent Literature 3 uses a torque correction amount storage means to make load torque pulsation of a compressor and motor torque coincide with each other by feedforward control. With the feedforward control, it is possible to suppress high-frequency speed pulsation even in a case of sensorless control.

CITATION LIST

Patent Literature

Patent Literature 1: Japanese Patent Application Laid-open No. H1-308184
Patent Literature 2: Japanese Patent No. 4221307
Patent Literature 3: Japanese Patent Application Laid-open No. 2001-37281

SUMMARY

Technical Problem

However, the control method disclosed in Patent Literature 1 cannot reduce rotational unevenness when high-frequency speed pulsation cannot be accurately detected. If a speed sensor or a position sensor is used, the rotation speed can be accurately detected but apparatus cost increases. However, when the speed sensor or the position sensor is not used, it is impossible to accurately estimate the transitional pulsation of the rotation speed due to a constraint on an estimation response, and consequently, it is not easy to use the control method disclosed in Patent Literature 1.

The sensorless vector control method disclosed in Patent Literature 2 may not contribute to reduction of high-frequency vibration. It is described in Patent Literature 2 that "when the maximum frequency of a frequency at which the compressor is driven is 100%, even in a range exceeding 30%, it is possible to realize lowered noise and reduced vibration", but it is not described what is the percentage of the maximum frequency, which is effective. In order to suppress vibration in a high-frequency range based on a position estimation error in the sensorless control, it is required to set an estimation response of a position estimation system very high. This is because when the estimation response of the position estimation system is insufficient, high-frequency vibration components cannot be detected, thereby making it difficult to perform vibration suppression control. However, in a general state of the art published in academic societies and papers, a limit of the estimation response is about several hundreds of rad/s. Considering from an upper limit value of the estimation response, it is extremely difficult to accurately detect the pulsation of the position estimation error in a region of 40% or more of the maximum frequency of a compressor. Therefore, when the required frequency is higher than the above, vibration reduction is difficult with the technique disclosed in Patent Literature 2. The sensorless vector control method by feedback control disclosed in Patent Literature 2 is largely different from the sensorless vector control method using an adaptive observer. For this reason, it is difficult in principle to combine the vibration suppression control of Patent Literature 2 with the sensorless vector control method using an adaptive observer.

The sensorless vector control method disclosed in Patent Literature 3 generally requires preadjustment, and it is not certain whether pulsation can be appropriately suppressed when a previously assumed operating condition differs from an actual operating condition.

As described above, in sensorless control of AC motors, it is not easy to suppress high-frequency speed pulsation or torque pulsation.

The present invention has been made in view of the above circumstances, and an object thereof is to provide a speed estimation apparatus for an AC motor capable of accurately estimating high-frequency speed pulsation in sensorless control of the AC motor.

Solution to Problem

In order to solve the above-mentioned problems and achieve the object, the present invention provides a speed estimation apparatus for an AC motor, comprising: a model deviation calculation unit to calculate a model deviation based on a voltage, a current, and an estimated angular velocity of an AC motor; a first angular velocity estimation unit to calculate a first estimated angular velocity as a low-frequency component including a DC component of a real angular velocity based on the model deviation; a second angular velocity estimation unit to calculate a second estimated angular velocity as a high-frequency component of a real angular velocity based on a specific high-frequency component included in the model deviation; and an adder to add the first estimated angular velocity and the second estimated angular velocity together, wherein an addition value of the first estimated angular velocity and the second estimated angular velocity is fed back as the estimated angular velocity to the model deviation calculation unit.

Advantageous Effects of Invention

According to the present invention, it is possible to accurately estimate high-frequency speed pulsation in sensorless control of an AC motor.

DESCRIPTION OF EMBODIMENTS

Hereinafter, a speed estimation apparatus for an AC motor, a driving apparatus for an AC motor, a refrigerant compressor, and a refrigeration cycle apparatus according to each embodiment of the present invention will be described in detail with reference to the drawings. The invention is not necessarily limited by the embodiments.

First Embodiment

Figure 1:
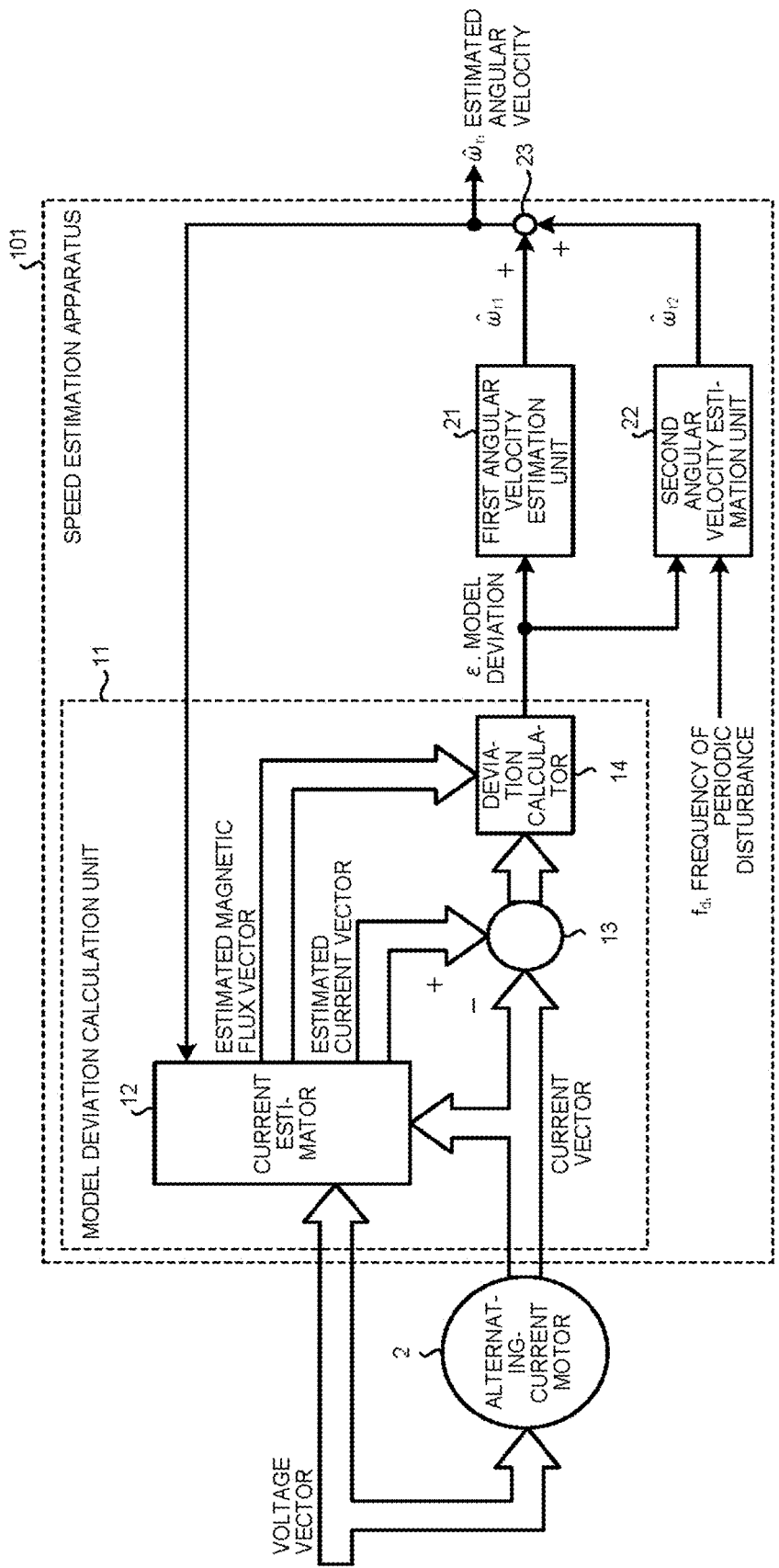
FIG. 1 is a diagram illustrating a configuration of a speed estimation apparatus for an AC motor according to a first embodiment of the present invention.

FIG. 1 is a diagram illustrating a configuration of a speed estimation apparatus for an AC motor according to a first embodiment of the present invention. Hereinafter, the speed estimation apparatus for an AC motor according to the first embodiment may be simply referred to as a speed estimation apparatus 101. The speed estimation apparatus 101 estimates a rotation speed of an AC motor 2 using a voltage vector and a current vector, applied to the AC motor 2, in compliance with a manner of an adaptive observer, and outputs the rotation speed as an estimated angular velocity $\hat{\omega}_r$.

The speed estimation apparatus 101 includes a model deviation calculation unit 11 and a first angular velocity estimation unit 21. The model deviation calculation unit 11 calculates a model deviation ε based on a voltage vector, a current vector, and an estimated angular velocity $\hat{\omega}_r$. The first angular velocity estimation unit 21 calculates a first estimated angular velocity $\hat{\omega}_{r1}$ as a low-frequency component including a DC component of a real angular velocity based on the model deviation ε. The speed estimation apparatus 101 further includes a second angular velocity estimation unit 22 and an adder 23. The second angular velocity estimation unit 22 calculates a second estimated angular velocity $\hat{\omega}_{r2}$ as a high-frequency component of the real angular velocity based on a specific high-frequency component of the model deviation ε. The adder 23 calculates the estimated angular velocity $\hat{\omega}_r$ by adding the second estimated angular velocity $\hat{\omega}_{r2}$ to the first estimated angular velocity $\hat{\omega}_{r1}$. The speed estimation apparatus 101 is characterized in that the apparatus 101 has the second angular velocity estimation unit 22, and the second angular velocity estimation unit 22 will be described later in detail.

The model deviation calculation unit 11 includes a current estimator 12, a subtractor 13, and a deviation calculator 14. The current estimator 12 calculates and outputs an estimated magnetic flux vector and an estimated current vector based on the voltage vector, the current vector, and the estimated angular velocity $\hat{\omega}_r$ of the AC motor 2. The subtractor 13 subtracts the current vector from the estimated current vector, and calculates and outputs a current deviation vector. The deviation calculator 14 receives the current deviation vector as an input, extracts an orthogonal component of the estimated magnetic flux vector as a scalar quantity, and outputs this value as a model deviation. As a method for extracting an orthogonal component of an estimated magnetic flux vector as a scalar quantity, there have been publicly known a method of performing coordinate transformation of a current deviation vector onto two rotation axes, and a method of calculating the magnitude of an outer product value of a current deviation vector and an estimated magnetic flux vector.

The current estimator 12 estimates a current and magnetic flux from a state equation of the AC motor 2. In this example, the AC motor 2 is assumed to be a generally-used embedded magnet type synchronous AC motor, but even with the AC motor 2 other than the embedded magnet type synchronous AC motor, the current estimator 12 can estimate a current in a similar manner as long as a state equation can be established. Examples of the AC motor 2 other than the embedded magnet type synchronous AC motor include a surface magnet type synchronous motor and an induction motor. In the present application, description will be given for a rotary motor, but a similar technique can be applied to a linear motion motor. That is because the following interpretation is possible; "a linear motion motor is a rotary motor whose rotor radius is infinite".

In a case of the embedded magnet type synchronous AC motor, the state equation is expressed as the following formulas (1) and (2). In the formulas, $L_d$ and $L_q$ represent inductances of a d-axis and a q-axis, respectively. R represents an armature resistance. $\omega$ represents a primary angular frequency. $\omega_r$ represents an angular velocity. $v_{ds}$ represents a d-axis voltage. $v_{qs}$ represents a q-axis voltage. $i_{ds}$ represents a d-axis current. $i_{qs}$ represents a q-axis current. $\phi_{ds}$ represents d-axis stator magnetic flux. $\phi_{qs}$ represents q-axis stator magnetic flux. $\phi_{dr}$ represents d-axis rotor magnetic flux. The symbol "^" represents an estimated value.

[Formula 1]

$$\frac{d}{dt}\begin{bmatrix}\hat{\phi}_{ds}\\ \hat{\phi}_{qs}\\ \hat{\phi}_{dr}\end{bmatrix} = \begin{pmatrix}-\frac{R}{L_d} & \omega & 0\\ -\omega & -\frac{R}{L_q} & -\hat{\omega}_r\\ 0 & 0 & 0\end{pmatrix}\begin{bmatrix}\hat{\phi}_{ds}\\ \hat{\phi}_{qs}\\ \hat{\phi}_{dr}\end{bmatrix} + \begin{bmatrix}v_{ds}\\ v_{qs}\\ 0\end{bmatrix} - \begin{bmatrix}h_{11} & h_{12}\\ h_{21} & h_{22}\\ h_{31} & h_{32}\end{bmatrix}\begin{bmatrix}\hat{i}_{ds}-i_{ds}\\ \hat{i}_{qs}-i_{qs}\end{bmatrix} \quad (1)$$

[Formula 2]

$$\begin{bmatrix}\hat{i}_{ds}\\ \hat{i}_{qs}\end{bmatrix} = \begin{bmatrix}1/L_d & 0 & 0\\ 0 & 1/L_q & 0\end{bmatrix}\begin{bmatrix}\hat{\phi}_{ds}\\ \hat{\phi}_{qs}\\ \hat{\phi}_{dr}\end{bmatrix} \quad (2)$$

Here, the primary angular frequency is given as the following formula (3). $h_{41}$ to $h_{42}$ represent observer gains.

[Formula 3]

$$\omega = \hat{\omega}_r - \frac{h_{41}(\hat{i}_{ds}-i_{ds}) + h_{42}(\hat{i}_{qs}-i_{qs})}{\hat{\phi}_{dr}} \quad (3)$$

The above formulas (1) and (2) are formulas based on usual induced voltages. However, even if the formulas (1) and (2) are modified to express them in a form of extended induced voltages, similar calculation can be performed. Since the formula (1) includes the estimated angular velocity $\hat{\omega}_r$, when the estimated angular velocity $\hat{\omega}_r$ and the actual angular velocity $\omega_r$ do not coincide with each other, an error occurs in current estimation. In this example, the model deviation $\varepsilon$ is defined as the following formula (4), and the speed estimation apparatus 101 adjusts a value of the estimated angular velocity $\hat{\omega}_r$ so that the model deviation $\varepsilon$ becomes zero by using the first angular velocity estimation unit 21 and the second angular velocity estimation unit 22.

[Formula 4]

$$\varepsilon = \frac{\hat{i}_{qs} - i_{qs}}{\hat{\phi}_{dr}} \quad (4)$$

A difference between the speed estimation apparatus 101 according to the first embodiment and a conventional adaptive observer resides in that the speed estimation apparatus 101 includes the second angular velocity estimation unit 22. Hereinafter, the conventional adaptive observer will be described.

Figure 2:
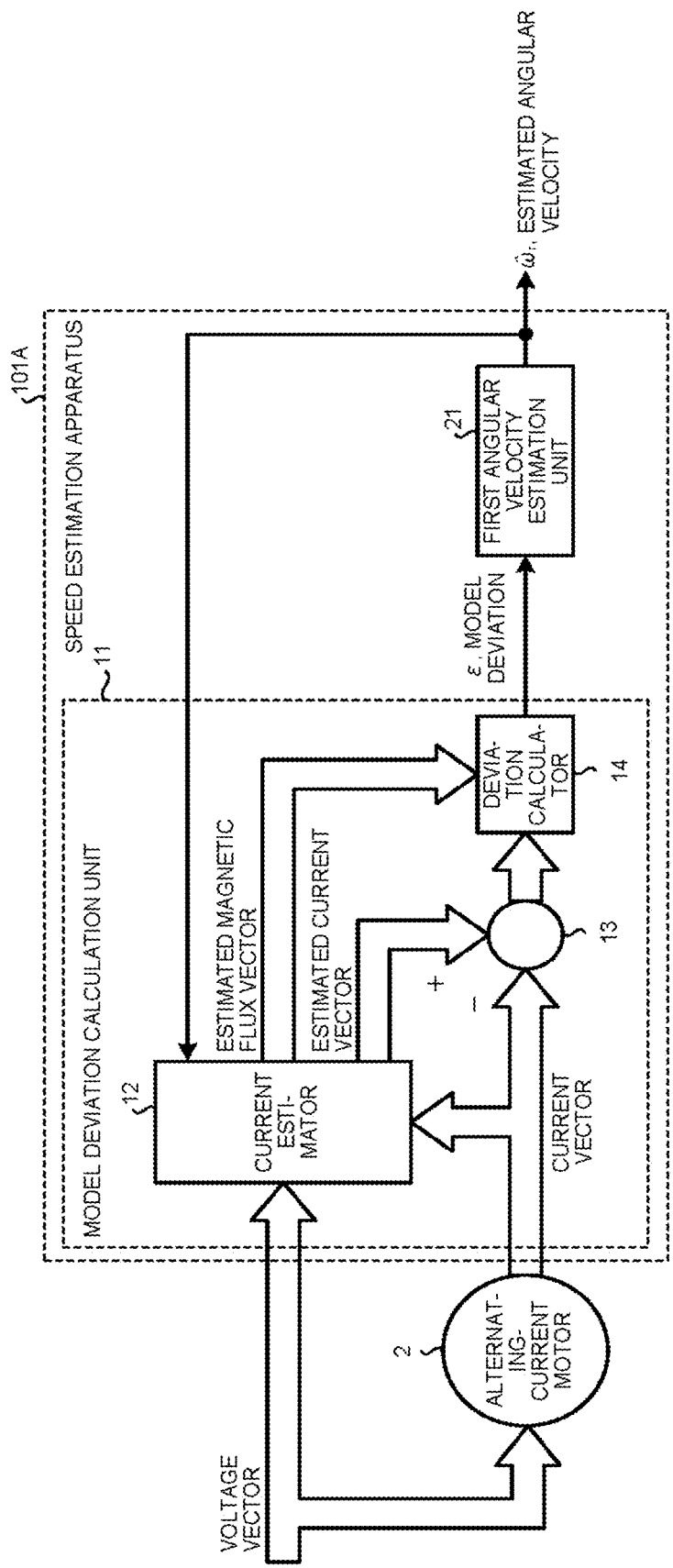
FIG. 2 is a diagram illustrating a configuration of a speed estimation apparatus for an AC motor according to a comparative example.

FIG. 2 is a diagram illustrating a configuration of a speed estimation apparatus for an AC motor according to a comparative example. FIG. 2 illustrates a speed estimation apparatus 101A which operates in accordance with the sensorless vector control method using the conventional adaptive observer. The adaptive observer of the speed estimation apparatus 101A is disclosed in Japanese Patent Application Laid-open No. 2003-302413. In the speed estimation apparatus 101A, it has been intended to adjust the model deviation $\varepsilon$ to zero only by the first angular velocity estimation unit 21.

In the speed estimation apparatus 101A illustrated in FIG. 2, the first angular velocity estimation unit 21 is composed of a Proportional Integral (PI) controller and an integrator, which are not illustrated. The speed estimation apparatus 101A adjusts the estimated angular velocity $\hat{\omega}_r$ according to the following formula (5). $K_P$ represents a proportional gain of the first angular velocity estimation unit 21. $K_I$ represents an integral gain of the first angular velocity estimation unit 21. s is an operator for Laplace transform. s means a derivation, and 1/s means integration. The configuration of the first angular velocity estimation unit 21 included in the speed estimation apparatus 101A is merely an example, and other controllers may be used therefor. For example, according to Japanese Patent Application Laid-open No. 2003-302413, a case is known in which the first angular velocity estimation unit 21 is configured only by PI controller without using an integrator.

[Formula 5]

$$\hat{\omega}_r = \frac{1}{s}\left(\left(K_P + \frac{K_I}{s}\right)\cdot \varepsilon\right) \quad (5)$$

A transfer function Ga(s) from the estimated angular velocity $\hat{\omega}_r$ to the model deviation ε is publicly known by the transactions of the Institute of Electrical Engineers of Japan, as Non-Patent Literature, "Speed Sensorless Vector Control Method of Induction Motor Including A Low Speed Region" (Vol. 120-D, No. 2, 2000), page 226, and can be approximated by a first-order lag as in the following formula (6).

[Formula 6]

$$G_a(s) = \frac{A_x}{1+s\cdot T_x} \quad (6)$$

Figure 3:
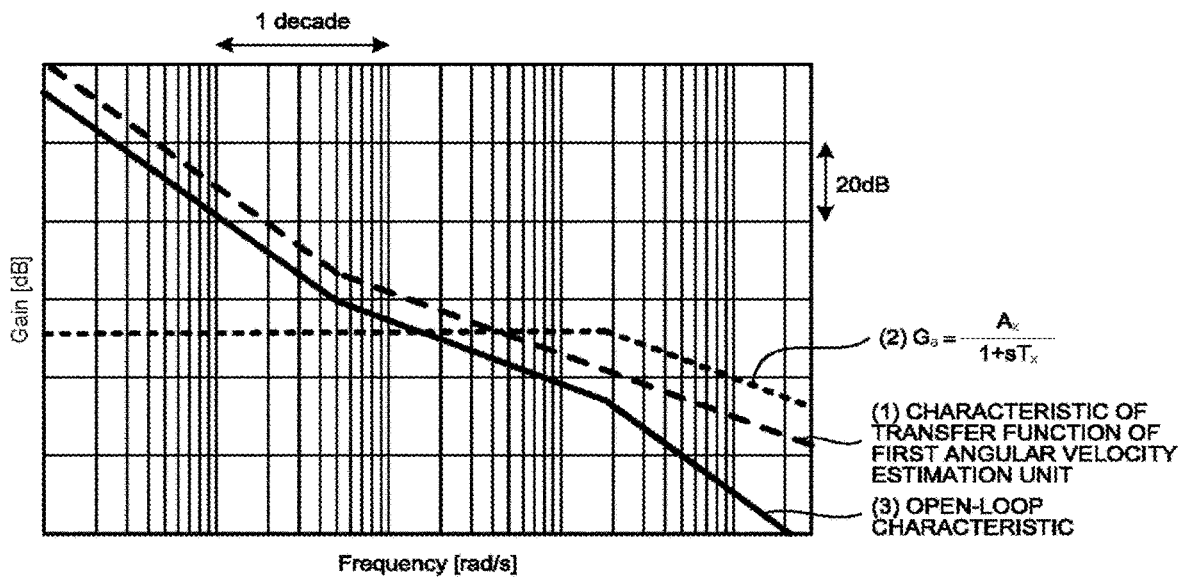
FIG. 3 is a Bode plot of the speed estimation apparatus illustrated in FIG. 2.

FIG. 3 is a Bode plot of the speed estimation apparatus illustrated in FIG. 2. The horizontal axis represents frequency and the vertical axis represents gain. A transfer function of the first angular velocity estimation unit 21 of (1) indicated by a dotted line in FIG. 3 is designed so that the gain in a low range is high. In the transfer function of (1), the gain decreases as the frequency increases. In the low range, the gain decreases at a rate of −40 dB/decade, and at frequencies higher than a break point, the gain decreases at a rate of −20 dB/decade.

A transfer function Ga(s) of (2) indicated by a dotted line in FIG. 3 corresponds to the transfer function Ga(s) of the formula (6) and has a characteristic of first order lag from the estimated angular velocity $\hat{\omega}_r$ to the model deviation ε, and therefore, the gain decreases at a rate of −20 dB/decade in a range of frequency higher than a cutoff angular frequency.

When these two transfer functions are added together, a transfer function having an open-loop characteristic of (3) indicated by a solid line in FIG. 3 is obtained.

If a PI control gain of the above formula (5), that is, the proportional gain $K_P$ of the first angular velocity estimation unit 21 and the integral gain $K_I$ of the first angular velocity estimation unit 21 can be made sufficiently large, high-frequency speed pulsation can be accurately estimated. However, the gain is restricted by the influence of an estimation calculation cycle and a motor constant error. If the gain is forcibly increased, it becomes susceptible to the influence of high-frequency noise, so that appropriate estimation becomes impossible. Therefore, it has been difficult for the speed estimation apparatus 101A of the comparative example to capture high-frequency speed pulsation.

Figure 4:
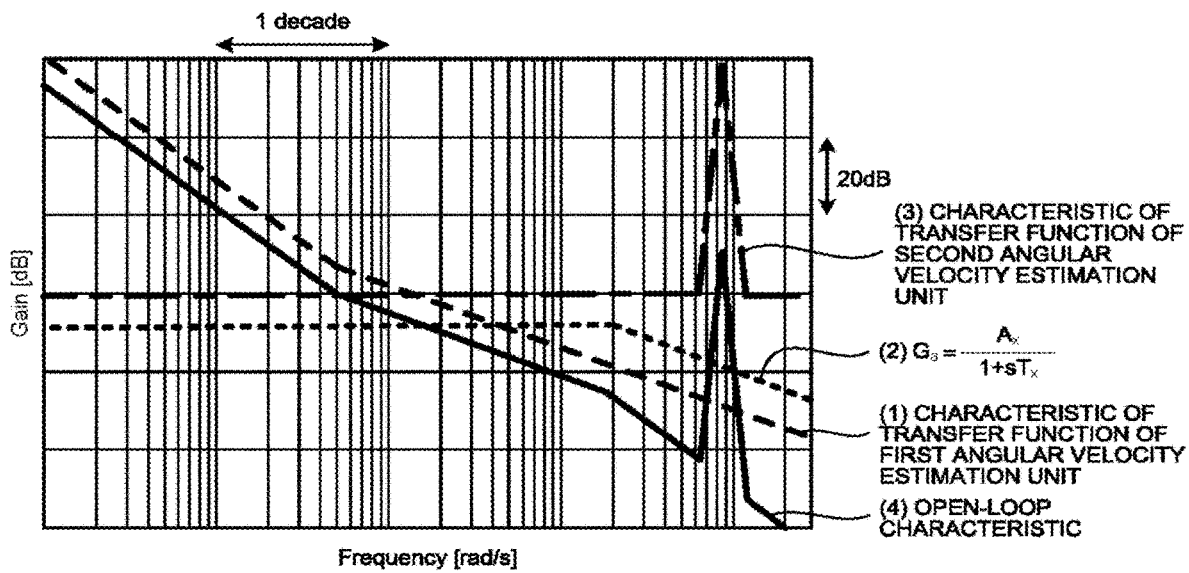
FIG. 4 is a Bode plot of the speed estimation apparatus for an AC motor according to the first embodiment of the present invention.

FIG. 4 is a Bode plot of the speed estimation apparatus for an AC motor according to the first embodiment of the present invention. The transfer functions of (1) and (2) in FIG. 4 are the same as the transfer functions of (1) and (2) in FIG. 3, respectively. The characteristic of (3) indicated by an alternate long and short dashed line is a characteristic of the transfer function of the second angular velocity estimation unit 22 illustrated in FIG. 1. The characteristic of (4) indicated by a solid line is an open-loop characteristic obtained by adding the transfer functions of (1) to (3) together. The second angular velocity estimation unit 22 illustrated in FIG. 1 is a controller having a peak at a specific frequency so as to capture high-frequency speed pulsation. The speed estimation apparatus 101 changes the open-loop characteristic by using the first angular velocity estimation unit 21 and the second angular velocity estimation unit 22 in combination. Then, the second angular velocity estimation unit 22 increases the gain only in a specific frequency band in which the occurrence of speed pulsation due to a periodic disturbance can be expected, instead of increasing the gain in all the high frequency ranges. Thus, the speed estimation accuracy can be improved.

Figure 5:
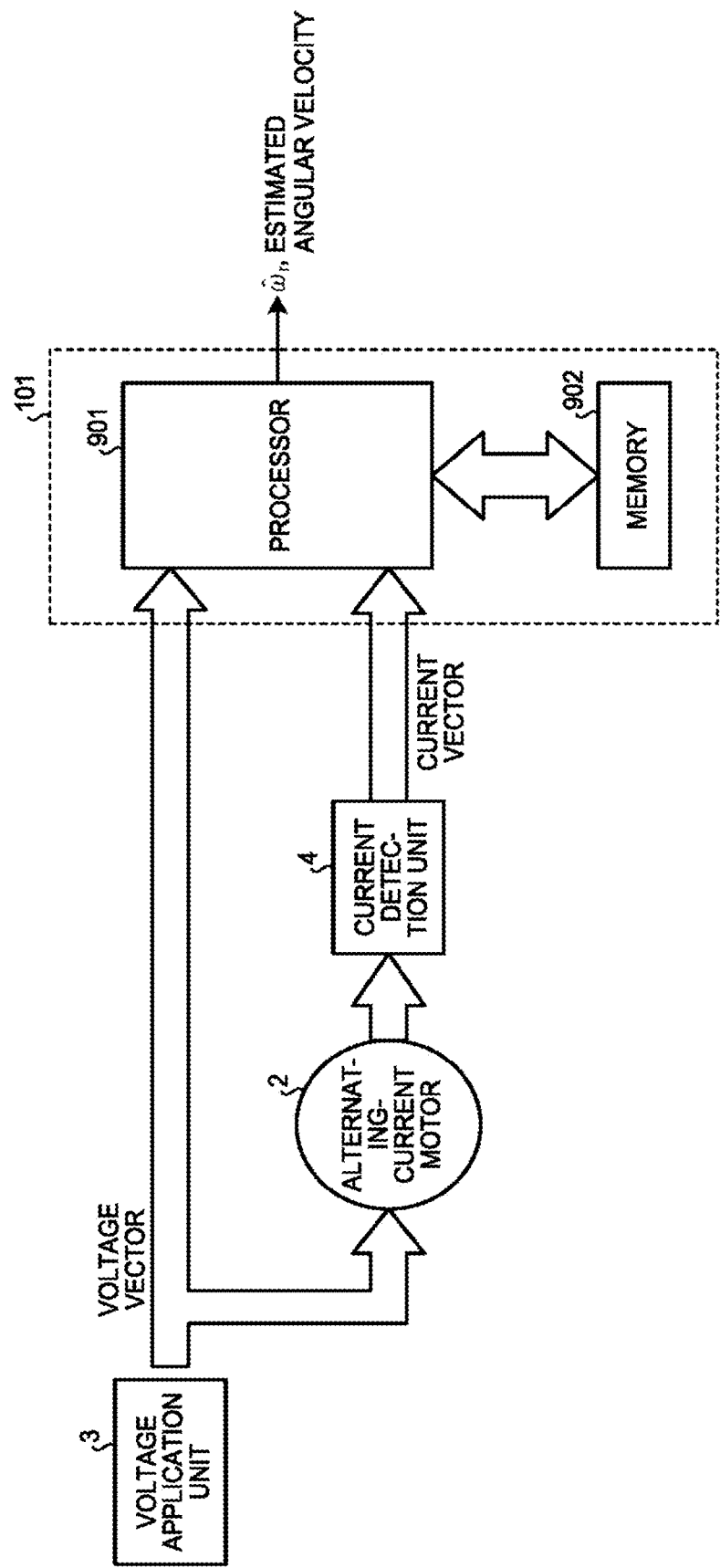
FIG. 5 is a hardware configuration diagram of the speed estimation apparatus for an AC motor according to the first embodiment of the present invention.

FIG. 5 is a hardware configuration diagram of the speed estimation apparatus for an AC motor according to the first embodiment of the present invention. Although not illustrated in FIG. 1, the voltage vector corresponds to a voltage command which is generated by a power converter that is a voltage application unit 3 illustrated in FIG. 5 and inputted to the speed estimation apparatus 101. The current vector is generated by a current detection unit 4 illustrated in FIG. 5. The current detection unit 4 detects an AC outputted from a driving apparatus (not illustrated) to the AC motor 2 and converts the detected AC into a dq-axis current detection value on a dq coordinate axis.

The speed estimation apparatus 101 includes a processor 901 and a memory 902. The memory 902 has a volatile storage device (not illustrated) typified by a random access memory and a nonvolatile auxiliary storage device (not illustrated) typified by a flash memory. The memory 902 may have an auxiliary storage device of a hard disk instead of the volatile storage device and the nonvolatile auxiliary storage device. The processor 901 executes a program inputted from the memory 902. Since the memory 902 has the auxiliary storage device and the volatile storage device, a program is inputted from the auxiliary storage device to the processor 901 via the volatile storage device. The processor 901 may output data of a calculation result to the volatile storage device of the memory 902, or may store the data in the auxiliary storage device via the volatile storage device.

Although various methods have been studied for the voltage application unit 3 and the current detection unit 4, any method may be used basically. The voltage application unit 3 and the current detection unit 4 may be provided inside the speed estimation apparatus 101. The speed estimation apparatus 101 may include a voltage detection means which detects a voltage vector outputted by the voltage application unit 3. In that case, the voltage detection means may be configured to transmit a command value of the voltage vector to the processor 901 so that a numerical value relating to a voltage detected by the voltage detection means is transmitted to the processor 901. The current detection unit 4 may be configured to transmit a detected numerical value to the processor 901, similarly.

The processor 901 calculates the estimated angular velocity $\hat{\omega}_r$ based on the current vector and the voltage vector of the AC motor 2. By the processor 901 performing the above-described calculation of the second angular velocity estimation unit 22, the speed pulsation caused by the periodic disturbance can be estimated with high accuracy. The processor 901 may also serve as a driving apparatus for the AC motor 2. That is, the processor 901 may be configured to not only perform speed estimation but also calculate a voltage command vector such that an estimated speed becomes a desired value. As a method for performing torque control with position sensorless, various methods including that in the above-described Non-Patent Literature are publicly known.

Figure 6A:
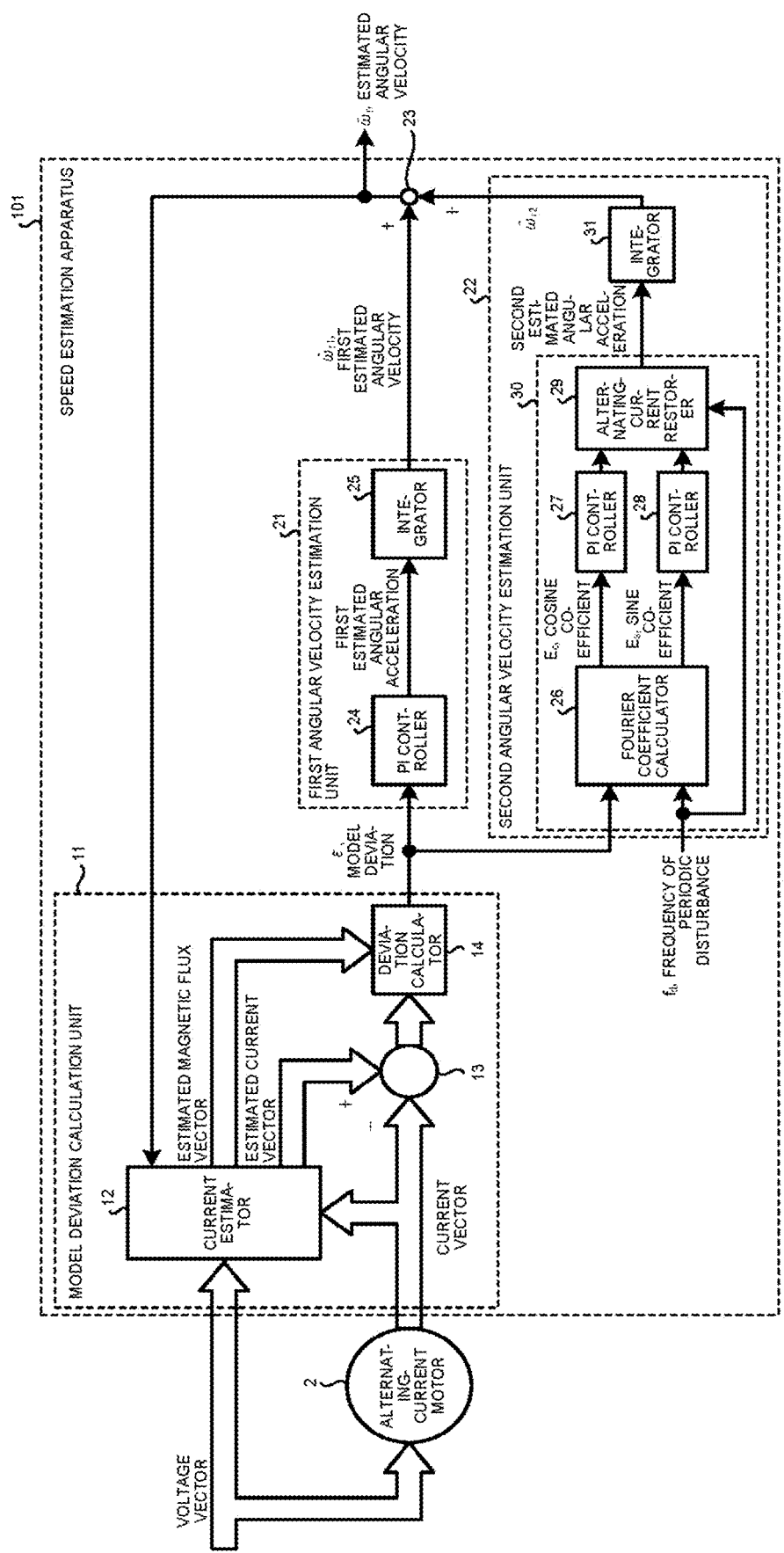
FIG. 6A is a diagram illustrating detailed configurations of a first angular velocity estimation unit and a second angular velocity estimation unit illustrated in FIG. 1.

FIG. 6A is a diagram illustrating detailed configurations of the first angular velocity estimation unit and the second angular velocity estimation unit illustrated in FIG. 1. As described with the above formula (5), the first angular velocity estimation unit 21 includes the PI controller 24 and the integrator 25. The PI controller 24 calculates a first estimated angular acceleration based on the model deviation ε. The integrator 25 integrates the first estimated angular acceleration to output the first estimated angular velocity $\hat{\omega}_{r1}$. Since the dimension of the output of the integrator 25 is speed, the PI controller 24 is referred to as a first angular acceleration estimation unit. As described with the Bode plot of FIG. 5, the first estimated angular acceleration is estimated as a low-frequency component including the DC component of the real angular velocity.

On the other hand, the second angular velocity estimation unit 22 as a second angular acceleration estimating means includes a second angular acceleration estimation unit 30 and an integrator 31. The second angular acceleration estimation unit 30 calculates a second estimated angular acceleration based on a frequency $f_d$ of the periodic disturbance and the model deviation ε. The integrator 31 integrates the second estimated angular acceleration to output the second estimated angular velocity $\hat{\omega}_r$.

The second angular acceleration estimation unit 30 includes a Fourier coefficient calculator 26, a PI controller 27 and a PI controller 28, and an AC restorer 29. The Fourier coefficient calculator 26 converts a specific high-frequency component of the model deviation ε to direct current and extracts the specific high-frequency component. The PI controllers 27 and 28, which are angular velocity auxiliary calculators, correct an estimation error in angular acceleration on the basis of the high-frequency component extracted by the Fourier coefficient calculator 26. The AC restorer 29 converts outputs of the PI controllers 27 and 28 back to AC. Although the Fourier coefficient calculator 26 is used as a frequency analyzer here, another type of frequency analysis method such as wavelet transformation may be used, for example.

The Fourier coefficient calculator 26 extracts a specific high-frequency component of the model deviation ε. When the frequency of the periodic disturbance is denoted by $f_d$, a cosine coefficient $E_c$ and a sine coefficient $E_s$ of the model deviation ε are calculated by the following formulas (7) and (8). t represents time.

[Formula 7]
$$E_c = \frac{1}{\pi}\int_{-\pi}^{\pi} \varepsilon \cdot \cos(2\pi f_d t)dt \quad (7)$$

[Formula 8]
$$E_s = \frac{1}{\pi}\int_{-\pi}^{\pi} \varepsilon \cdot \sin(2\pi f_d t)dt \quad (8)$$

The PI controller 27 performs PI control on the cosine coefficient $E_c$ of the model deviation ε as indicated by the following formula (9). The PI controller 28 performs PI control on the sine coefficient $E_s$ of the model deviation ε as indicated by the following formula (10). The AC restorer 29 performs calculation of the following formula (11) using the cosine coefficient $E_c$ PI-controlled by the PI controller 27 and the sine coefficient $E_s$ PI-controlled by the PI controller 28, thereby to be able to estimate the second angular acceleration as a specific high-frequency component of real angular acceleration. $K_{P2}$ represents a proportional gain of the second angular velocity estimation unit 22, $K_{I2}$ represents an integral gain of the second angular velocity estimation unit 22, and a dot above a character represents the order of derivation.

[Formula 9]
$$\hat{\Omega}_c = \left(K_{P2} + \frac{K_{I2}}{s}\right) \cdot E_c \quad (9)$$

[Formula 10]
$$\hat{\Omega}_s = \left(K_{P2} + \frac{K_{I2}}{s}\right) \cdot E_s \quad (10)$$

[Formula 11]
$$\dot{\hat{\omega}}_{r2} = \left(\hat{\Omega}_c \cdot \cos(2\pi f_d t) + \hat{\Omega}_s \cdot \sin(2\pi f_d t)\right) \quad (11)$$

The integrator 31 integrates the second angular acceleration estimated by the AC restorer 29 according to the following formula (12) to obtain the second estimated angular velocity $\hat{\omega}_{r2}$. The second estimated angular velocity $\hat{\omega}_{r2}$ is calculated as a specific high-frequency component of the real angular velocity.

[Formula 12]
$$\hat{\omega}_{r2} = \frac{1}{s}\dot{\hat{\omega}}_{r2} \quad (12)$$

An estimation equation of an angular velocity is expressed finally by the following formula (13). That is, the adder 23 adds the second estimated angular velocity $\hat{\omega}_{r2}$ calculated by the integrator 31 to the first estimated angular velocity $\hat{\omega}_{r1}$ calculated by the first angular velocity estimation unit 21, thereby obtaining the estimated angular velocity $\hat{\omega}_r$ of the following formula (13).

[Formula 13]
$$\hat{\omega}_r = \frac{1}{s}\left(\left(K_P + \frac{K_I}{s}\right) \cdot \varepsilon\right) + \hat{\omega}_{r2} \quad (13)$$

The formula (13) and the formula (5) are different from each other in that the second estimated angular velocity $\hat{\omega}_{r2}$ is used in the formula (13). In the second angular velocity estimation unit 22, an arbitrary harmonic of the model deviation ε is separated into a sine wave and a cosine wave, the waves are each converted to direct current and extracted, and then the extracted components are PI-controlled so that they become zero. Further, outputs of the PI controls are converted back to AC and integrated, so as to estimate the high-frequency component of the real angular velocity, thereby making the gain increased only in a portion of a specific frequency. Therefore, it is possible to estimate a pulsatile component of the speed due to the periodic disturbance with high accuracy as the second estimated angular velocity $\hat{\omega}_2$. The above-described second angular velocity estimation unit 22 has a structure of a kind of repetitive controller or learning controller. Therefore, instead of the above-described second angular velocity estimation unit 22, another kind of repetitive controller or learning controller may be used. As will be described in detail in a second embodiment, the integrator 31 in FIG. 6A may be omitted and the output of the AC restorer 29 may be handled as the second estimated angular velocity.

Figure 7A:
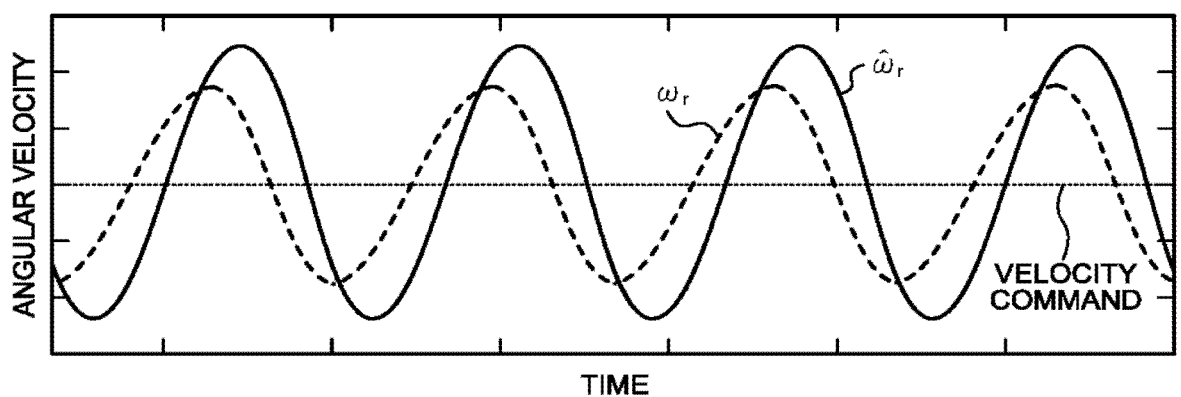
FIG. 7A is a diagram illustrating a result of a simulation by the conventional speed estimation apparatus for an AC motor illustrated in FIG. 2.
Figure 7B:
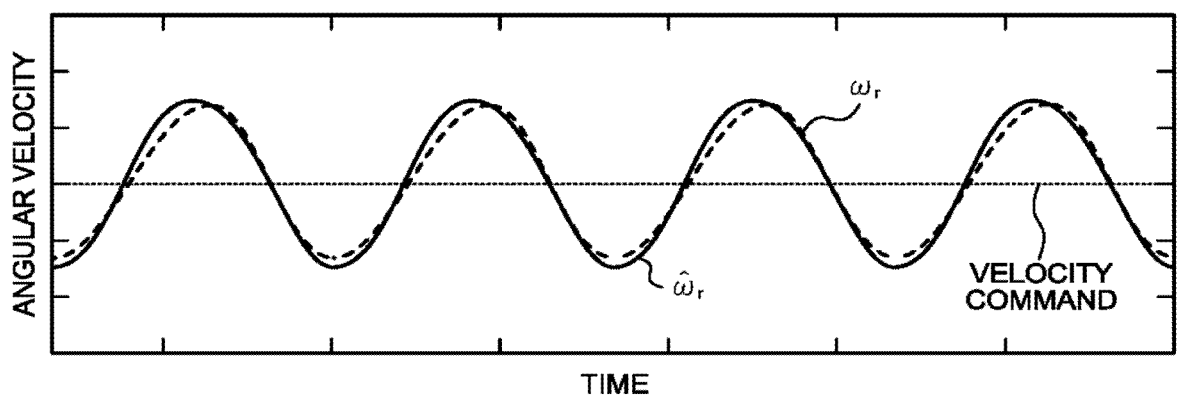
FIG. 7B is a diagram illustrating a result of a simulation by the speed estimation apparatus for an AC motor according to the first embodiment of the present invention.

FIG. 7A is a diagram illustrating a result of a simulation by the conventional speed estimation apparatus for an AC motor illustrated in FIG. 2, and FIG. 7B is a diagram illustrating a result of a simulation by the speed estimation apparatus for an AC motor according to the first embodiment of the present invention. In each of FIGS. 7A and 7B, the vertical axis represents angular velocity and the horizontal axis represents time.

In the conventional speed estimation apparatus 101A, when high-frequency speed pulsation occurs due to a periodic disturbance, the phase of the estimated angular velocity $\hat{\omega}_r$ indicated by a solid line is delayed with respect to the actual angular velocity $\omega_r$ indicated by a dotted line as illustrated in FIG. 7A. In addition, an error in amplitude is also caused between the actual angular velocity $\omega_r$ and the estimated angular velocity $\hat{\omega}_r$. As described above, the speed estimation accuracy is low in the conventional speed estimation apparatus 101A.

On the other hand, in the speed estimation apparatus 101 according to the first embodiment, as illustrated in FIG. 7B, a phase difference between the actual angular velocity $\omega_r$ and the estimated angular velocity $\hat{\omega}_r$ is reduced and an amplitude difference between the actual angular velocity $\omega_r$ and the estimated angular velocity $\hat{\omega}_r$ is also reduced. That is, in the speed estimation apparatus 101 according to the first embodiment, estimation errors in angular velocity are remarkably decreased, and the estimation accuracy of the angular velocity is improved. The reason why the amplitudes of the actual angular velocity $\omega_r$ illustrated in FIGS. 7A and 7B have their respective some differences is that the speed control is adversely affected in the speed estimation apparatus 101 due to the phase delay of the estimated angular velocity $\hat{\omega}_r$. The speed estimation apparatus 101 according to the first embodiment can not only accurately estimate the speed, but also be useful for improving the control performance when the apparatus 101 is used for control.

Another characteristic of the angular velocity estimation method in the speed estimation apparatus 101 according to the first embodiment is that angular acceleration is estimated without performing differential operation. A differential operation is usually required to obtain an angular acceleration from an angular velocity, but noise is apt to occur in differential operation. In general, a low-pass filter is used to avoid the influence of differential noise, but the estimation accuracy of the angular acceleration in the high-frequency range is deteriorated by the low-pass filter. Since the speed estimation apparatus 101 according to the first embodiment obtains the angular acceleration without performing differentiation, a waveform with less influence of noise is obtained, and speed pulsation suppression control described later is easily performed in the speed estimation apparatus 101 according to the first embodiment.

Second Embodiment

Figure 6B:
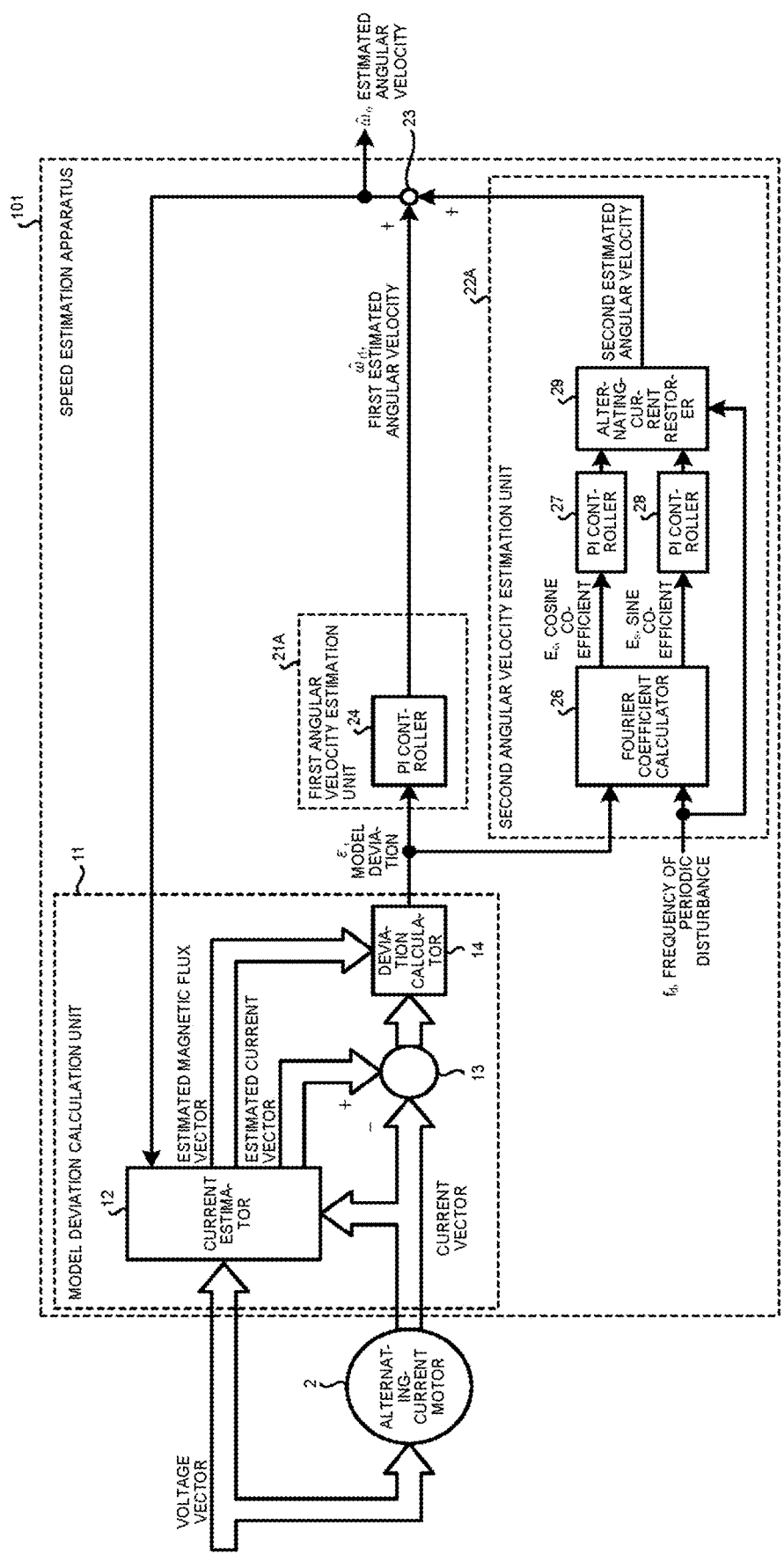
FIG. 6B is a diagram illustrating a configuration of a speed estimation apparatus for an AC motor according to a second embodiment of the present invention.

FIG. 6B is a diagram illustrating a configuration of a speed estimation apparatus for an AC motor according to the second embodiment of the present invention. A difference between the first and second embodiments is that the speed estimation apparatus 101 according to the second embodiment is obtained by omitting the integrator 25 and the integrator 31 from the configuration of the speed estimation apparatus 101 according to the first embodiment. Specifically, in the speed estimation apparatus 101 according to the second embodiment, a first angular velocity estimation unit 21A is used instead of the first angular velocity estimation unit 21, and a second angular velocity estimation unit 22A is used instead of the second angular velocity estimation unit 22. Further, the integrator 25 is omitted in the first angular velocity estimation unit 21A, and the integrator 31 is omitted in the second angular velocity estimation unit 22A.

In the second angular velocity estimation unit 22A, the PI controller 27 performs PI control on the cosine coefficient $E_c$ of the model deviation ε as indicated by the following formula (14). $K_{P3}$ represents a proportional gain of the second angular velocity estimation unit 22A and $K_{I3}$ represents an integral gain of the second angular velocity estimation unit 22A.

[Formula 14]

$$\hat{\Omega}_{c2} = \left(K_{P3} + \frac{K_{I3}}{s}\right) \cdot E_c \quad (14)$$

The PI controller 28 performs PI-control on the sine coefficient $E_s$ of the model deviation ε as indicated by the following formula (15).

[Formula 15]

$$\hat{\Omega}_{s2} = \left(K_{P3} + \frac{K_{I3}}{s}\right) \cdot E_s \quad (15)$$

The AC restorer 29 performs calculation of the following formula (16) using the cosine coefficient $E_c$ PI-controlled by the PI controller 27 and the sine coefficient $E_s$ PI-controlled by the PI controller 28, thereby making it possible to estimate a second angular velocity as a specific high-frequency component of a real angular velocity.

[Formula 16]

$$\hat{\omega}_{r3} = (\hat{\Omega}_{c2} \cdot \cos(2\pi f_d t) + \hat{\Omega}_{s2} \cdot \cos(2\pi f_d t)) \quad (16)$$

In the second embodiment, an estimation equation of an angular velocity is finally expressed by the following formula (17). $K_{P4}$ represents a proportional gain of the first angular velocity estimation unit 21A and $K_{I4}$ represents an integral gain of the first angular velocity estimation unit 21A. That is, the adder 23 adds a second estimated angular velocity $\hat{\omega}_{r3}$ calculated by the AC restorer 29 to a first estimated angular velocity $\hat{\omega}_{r1A}$ calculated by the first angular velocity estimation unit 21A, thereby obtaining the estimated angular velocity $\hat{\omega}_r$ of the following formula (17).

[Formula 17]

$$\hat{\omega}_r = \left(K_{P4} + \frac{K_{I4}}{s}\right) \cdot \varepsilon + \hat{\omega}_{r3} \quad (17)$$

As described above, in the conventional example in Japanese Patent Application Laid-open No. 2003-302413, there has been publicly known a case example is known in which the first angular velocity estimation unit 21 is configured only based on PI control without using the integrator 25. Similarly thereto, the second angular velocity estimation unit 22 can be configured without using the integrator 31. Also in a case of configuring the speed estimation apparatus 101 illustrated in FIG. 6B, similarly to the speed estimation apparatus 101 according to the first embodiment, it is possible to accurately estimate high-frequency speed pulsation as compared with the conventional example without the integrator 25. Since the reason therefor overlaps with the content described in the first embodiment, a description thereof will be omitted.

As a similar example of the second embodiment, what is conceivable is a configuration in which the first angular velocity estimation unit 21 includes the integrator 25 and the second angular velocity estimation unit 22 does not include the integrator 31, or a configuration in which the first angular velocity estimation unit 21 does not include the integrator 25 and the second angular velocity estimation unit 22 includes the integrator 31.

Regarding the speed estimation accuracy, the second embodiment is inferior to the first embodiment, but the second embodiment is more advantageous in terms of the amount of calculation required for the estimation calculation since the integral calculation is omitted. For this reason, in a case where calculation performance of the processor 901 illustrated in FIG. 5 is low and it is desired to reduce the calculation amount as much as possible, the configuration of the second embodiment is preferable. However, the configuration of the speed estimation apparatus 101 according to the first embodiment is preferable when performing speed pulsation suppression control described in a sixth embodiment, which will be described later in detail.

Third Embodiment

Figure 8:
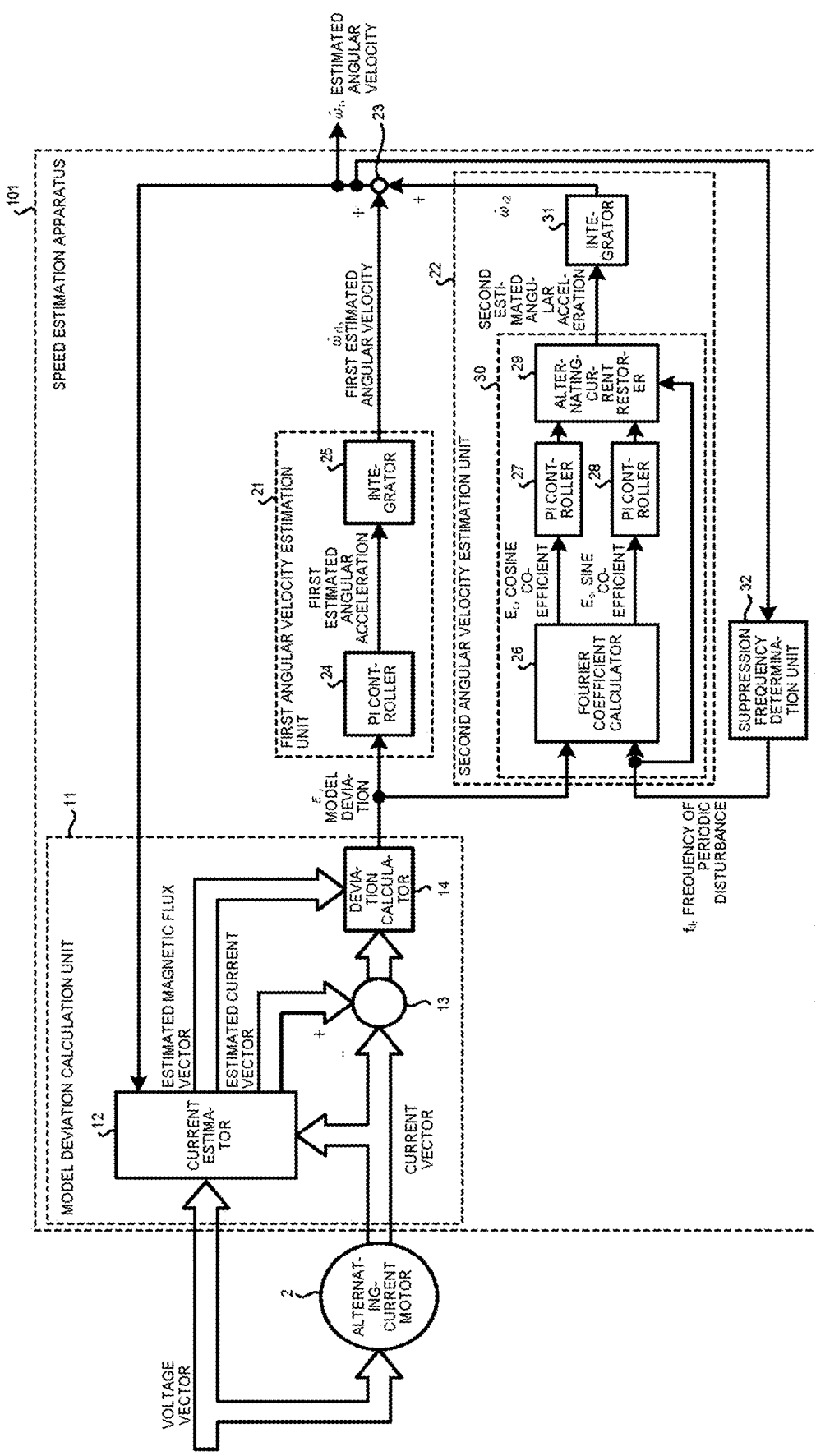
FIG. 8 is a diagram illustrating a configuration of a speed estimation apparatus for an AC motor according to a third embodiment of the present invention.

FIG. 8 is a diagram illustrating a configuration of a speed estimation apparatus for an AC motor according to a third embodiment of the present invention. A difference between the first and third embodiments is that the speed estimation apparatus 101 according to the third embodiment includes a suppression frequency determination unit 32 in addition to the configuration of the speed estimation apparatus 101 according to the first embodiment.

Most of periodic disturbances applied to the AC motor 2 are synchronized with an angular velocity of the AC motor 2. In a single rotary type refrigerant compressor, vibration of a 1f component of mechanical angular velocity is very large. In a twin rotary type refrigerant compressor having two compression chambers, vibration of a 2f component of mechanical angular velocity is large. In a scroll type compressor, although vibration peaks are dispersed due to the structure thereof, vibrations of the electrical angles 1f, 2f, and 3f are relatively large. The distortion of an induced voltage of the AC motor 2, or an output voltage error due to a deadtime of a power converter causes vibration of 6f of an electrical angular frequency. Offset and gain imbalance of a current detector cause a vibration of the electrical angle 1f and oscillations of the electrical angle 2f. As described above, the frequency $f_d$ of the periodic disturbance is often expressed as a function of the angular velocity of the AC motor 2.

The speed estimation apparatus 101 according to the third embodiment includes the suppression frequency determination unit 32 on the assumption that the frequency $f_d$ of the periodic disturbance changes in synchronization with the angular velocity of the AC motor 2. The suppression frequency determination unit 32 calculates the frequency $f_d$ of the periodic disturbance from the estimated angular velocity $\hat{\omega}_r$ outputted from the adder 23. Since the frequency $f_d$ of the periodic disturbance is often expressed as a function of the angular velocity of the AC motor 2, the ratio $f_d/\omega_r$ of the frequency $f_d$ of the periodic disturbance and the angular velocity $\omega_r$ of the AC motor 2 is herein denoted by γ. γ has a value which varies depending on factors of occurrence of the periodic disturbance. For example, when the periodic disturbance is 1f vibration of the mechanical angular velocity, $γ=1/(2\pi P_m)$ is satisfied, and when the periodic disturbance is 6f vibration of an electrical angular velocity, $γ=6/(2\pi)$ is satisfied. In the above, $P_m$ means the number of pole pairs of the AC motor. m is a natural number of 1 or more.

The suppression frequency determination unit 32 determines the frequency $f_d$ of the periodic disturbance, that is, a suppression frequency by multiplying the estimated angular velocity $\hat{\omega}_r$ by the ratio γ determined depending on the factors of occurrence of the periodic disturbance. A designer of the speed estimation apparatus 101 may arbitrarily determine which periodic disturbance element is to be suppressed out of various periodic disturbances applied to the AC motor 2. In normal cases, the design is developed to suppress a periodic disturbance element which has a large influence on speed estimation. The frequency $f_d$ of the periodic disturbance calculated by the suppression frequency determination unit 32 is used for calculation of the Fourier coefficient calculator 26. Thus, even when the speed of the AC motor 2 changes, accurate speed estimation can be performed.

Fourth Embodiment

Figure 9:
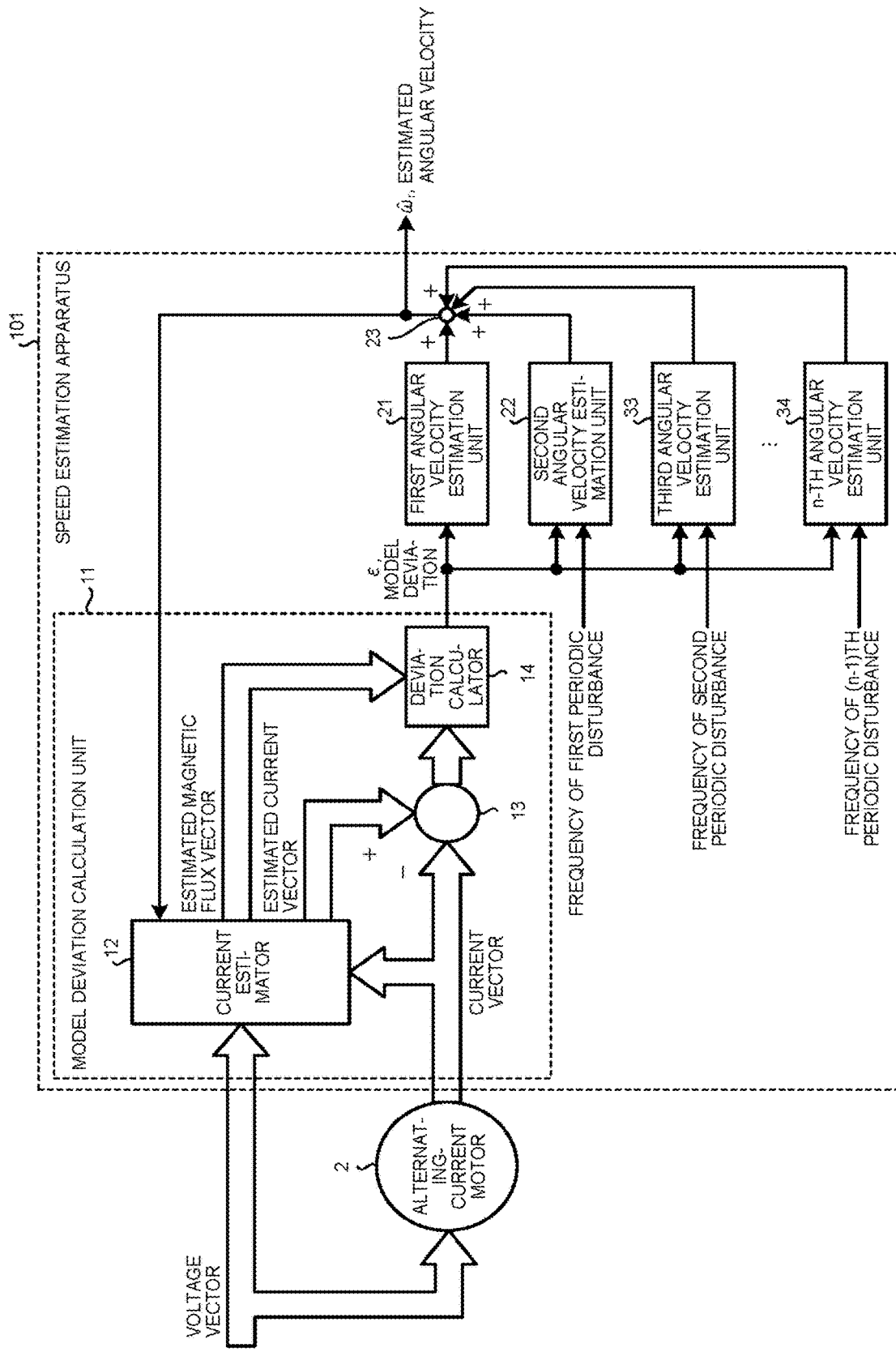
FIG. 9 is a diagram illustrating a configuration of a speed estimation apparatus for an AC motor according to a fourth embodiment of the present invention.

FIG. 9 is a diagram illustrating a configuration of a speed estimation apparatus for an AC motor according to a fourth embodiment of the present invention. In the fourth embodiment, description is given for a case where speed is pulsating due to periodic disturbances of a plurality of frequencies. The speed estimation apparatus 101 according to the fourth embodiment includes a third angular velocity estimation unit 33 in addition to the second angular velocity estimation unit 22 which calculates the second estimated angular velocity as a first high-frequency component of a real angular velocity caused by a first periodic disturbance. The third angular velocity estimation unit 33 calculates a third estimated angular velocity as a second high-frequency component of a real angular velocity caused by a second periodic disturbance. A configuration of the third angular velocity estimation unit 33 is the same as the configuration of the second angular velocity estimation unit 22, but a difference resides in that the second angular velocity estimation unit 22 has input of the frequency of the first periodic disturbance, whereas the third angular velocity estimation unit 33 has input of the frequency of the second periodic disturbance. When there is a margin in the processing capability of the processor 901 illustrated in FIG. 5, more angular velocity estimation units may be parallelized in the speed estimation apparatus 101. In FIG. 9, there is provided an n-th angular velocity estimation unit 34 which reduces a speed estimation error due to an (n−1)th periodic disturbance. In the above, n is a positive integer of 3 or more.

By parallelizing multiple angular velocity estimation units as described above, it is possible to improve the speed estimation accuracy even when periodic disturbances of multiple frequencies are applied.

Fifth Embodiment

Figure 10:
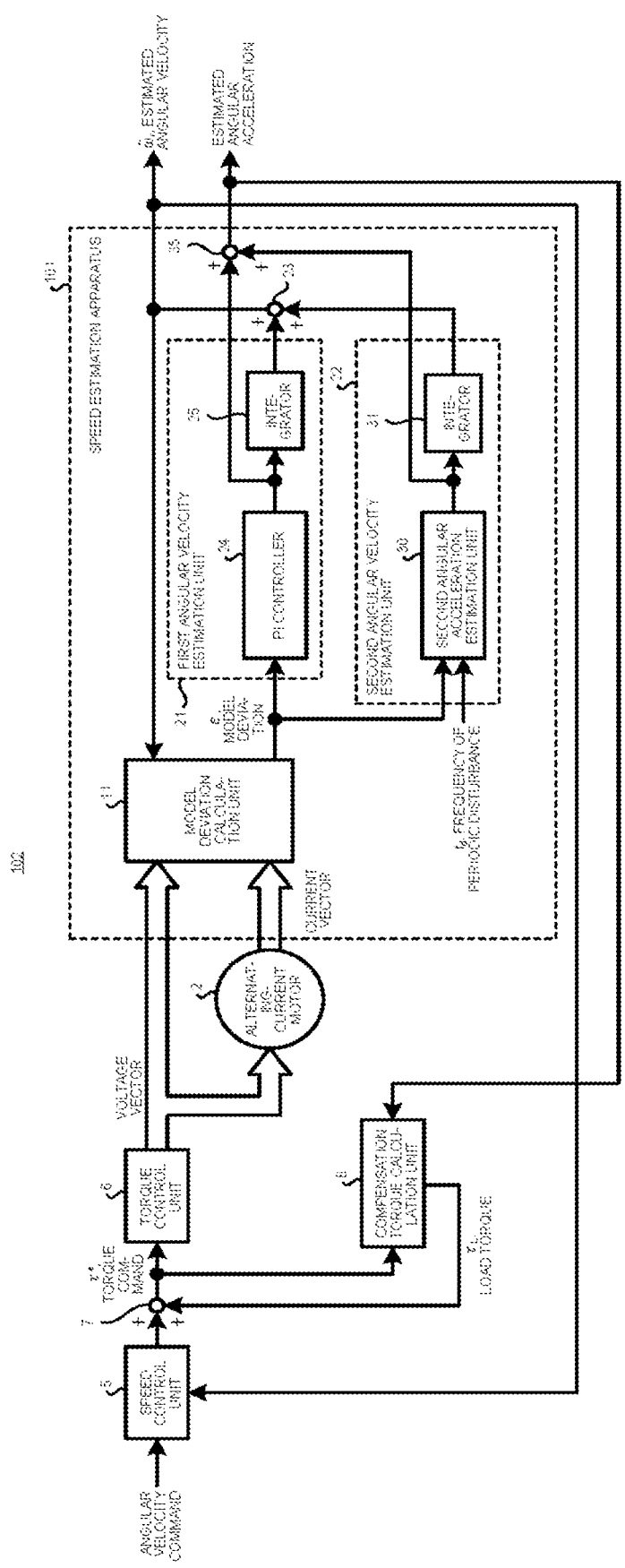
FIG. 10 is a diagram illustrating a configuration of a driving apparatus for an AC motor according to a fifth embodiment of the present invention.

FIG. 10 is a diagram illustrating a configuration of a driving apparatus for an AC motor according to a fifth embodiment of the present invention. Hereinafter, the driving apparatus for an AC motor according to the fifth embodiment may be simply referred to as a driving apparatus 102 in some cases. The driving apparatus 102 includes the speed estimation apparatus 101 according to the first, second, or third embodiment, a speed control unit 5, a torque control unit 6 as a voltage application unit, an adder 7, and a compensation torque calculation unit 8. The compensation torque calculation unit 8 generates a compensation torque signal which reduces speed pulsation caused by a periodic disturbance. In general, a PID controller is used for the speed control unit 5, and the speed control unit 5 performs proportional, integral, and differential operations based on a speed deviation and generates a torque command so as to make the speed deviation to be zero. The above speed deviation is obtained as "speed deviation"="angular velocity command"−"estimated angular velocity". In the speed control unit 5, a torque command may be generated in feedforward from an angular velocity command, and a PID controller and a feedforward controller may be used in combination. The torque control unit 6 includes the voltage application unit 3 illustrated in FIG. 5.

In the fifth embodiment, the speed estimation apparatus 101 includes an adder 35 which calculates an estimated angular acceleration by adding the second estimated angular acceleration to the first estimated angular acceleration. The compensation torque calculation unit 8 includes a disturbance torque estimation unit (not illustrated) which estimates a disturbance torque based on the estimated angular acceleration calculated by the speed estimation apparatus 101, to generate a compensation torque signal based on the disturbance torque estimated by the disturbance torque estimation unit.

The driving apparatus 102 further includes a current detection unit (not illustrated) which detects an electric current flowing through the AC motor 2. The current detection unit corresponds to the current detection unit 4 illustrated in FIG. 5.

In the fifth embodiment, compensation of speed pulsation by a disturbance observer will be described. When the speed pulsation cannot be suppressed by the speed control unit 5 alone, the driving apparatus 102 performs pulsation compensation using the compensation torque calculation unit 8. When the torque control unit 6 can control the torque in accordance with a command value, the angular velocity $\omega_r$ of the AC motor 2 is expressed by the following formula (18). In the formula, J represents inertia, $\tau^*$ represents a torque command, $\tau_L$ is load torque, and s is a Laplace transform operator.

[Formula 18]

$$\omega_r = \frac{1}{sJ}(\tau^* - \tau_L) \quad (18)$$

By transforming the above formula (18), the following formula (19) is obtained.

[Formula 19]

$$\tau_L = \tau^* - sJ\omega_r \quad (19)$$

The above formula (19) is an equation of the load torque $\tau_L$. if the inertia is known, the load torque $\tau_L$ can be calculated from the estimated angular acceleration and the torque command $\tau^*$ The disturbance torque estimation unit (not illustrated) in the compensation torque calculation unit 8 estimates the load torque $\tau_L$ based on the torque command $\tau^*$ and the estimated angular acceleration calculated by the adder 35. In a case where the command torque and the generated torque actually generated by the motor do not coincide with each other due to temperature changes and characteristic variations of the AC motor 2 when performing the calculation of the above formula (19), a generated torque measurement means which measures a generated torque may be further provided.

Based on an estimated load torque, the compensation torque calculation unit 8 determines a compensation torque which compensates the speed pulsation. If it is desired to make the speed pulsation zero, it suffices to make the load torque $\tau_L$ and the torque command $\tau^*$ coincide with each other. Therefore, the load torque $\tau_L$ estimated from the above formula (19) is added as the compensation torque to the torque command $\tau^*$. In normal cases, in order to reduce sensitivity to noise, a low-pass filter is applied to the estimated load torque to ensure the stability of the control system. If it is desired to cancel only a specific high-frequency periodic disturbance component out of the estimated load torque $\tau_L$, a band-pass filter may be used. Even if only a specific high-frequency component is extracted by Fourier series expansion and converted back to AC, an effect similar to the effect of the band-pass filter can be obtained.

Such a calculation method of the compensation torque is a very general method in the category of control using a position sensor, but the method cannot be used in conventional position sensorless control. That is because high-frequency speed pulsation could not be captured with high accuracy by the conventional position sensorless control.

By using the speed estimation apparatus 101 according to the first, third, or fourth embodiment, the driving apparatus 102 according to the fifth embodiment can grasp high-frequency speed pulsation with high accuracy. Therefore, even in the position sensorless control, the above-described calculation method of the compensation torque can be used, and the speed pulsation can be reduced.

In the fifth embodiment, the periodic disturbance is load torque pulsation of a mechanical load device connected to the AC motor 2, and the compensation torque calculation unit 8 according to the fifth embodiment suppresses the speed pulsation caused by the load torque pulsation.

In the fifth embodiment, the periodic disturbance is any of torque ripple generated due to a deadtime of the voltage application unit, torque ripple due to the distortion of an induced voltage of the AC motor 2, torque ripple due to an offset error of the current detection unit 4, and torque ripple due to a current detection gain error of the current detection unit 4. The compensation torque calculation unit 8 suppresses the speed pulsation caused by the torque ripple. This makes it possible to suppress high-frequency speed pulsation without preadjustment.

Sixth Embodiment

Figure 11:
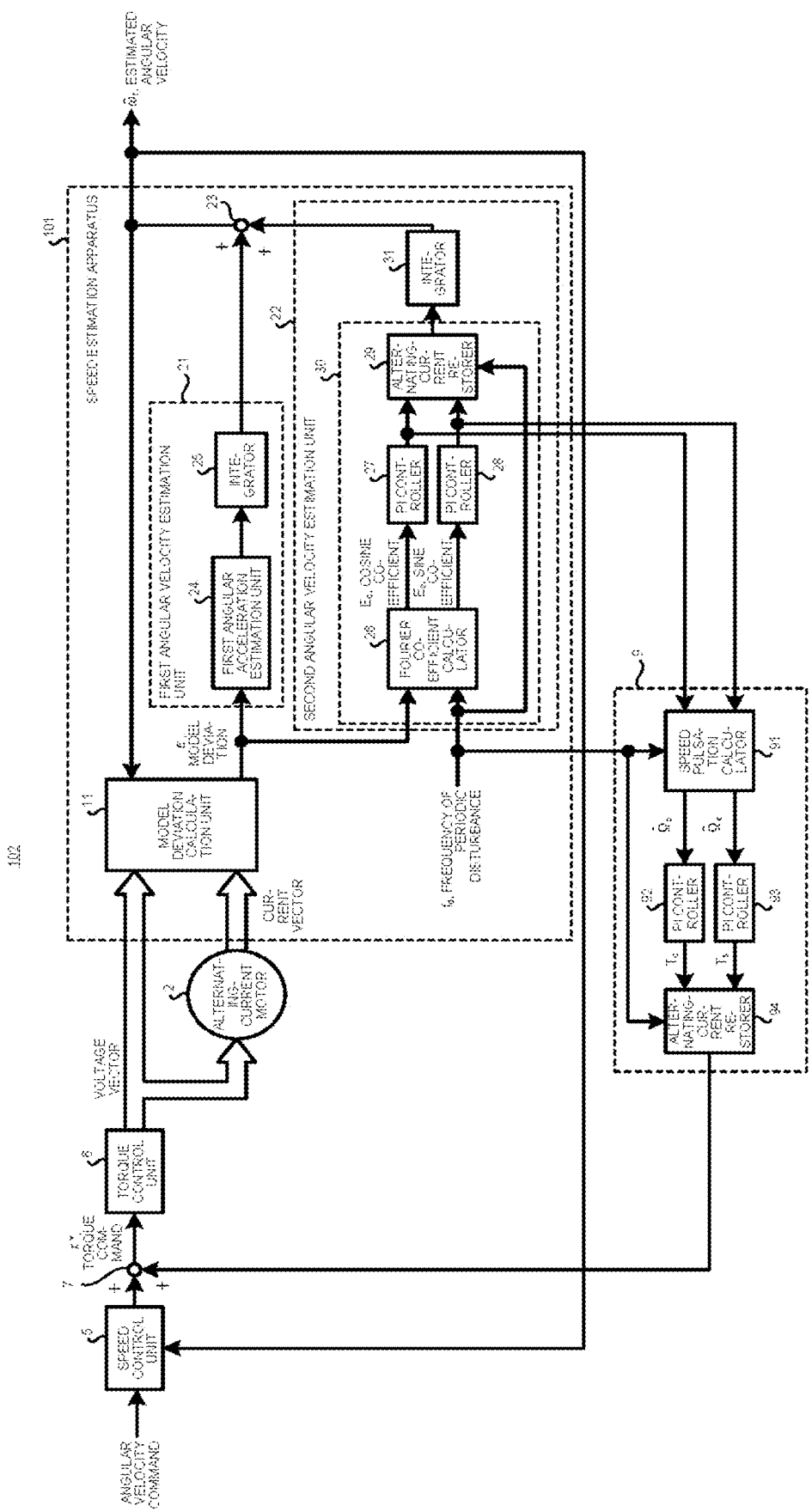
FIG. 11 is a diagram illustrating a configuration of a driving apparatus for an AC motor according to a sixth embodiment of the present invention.

FIG. 11 is a diagram illustrating a configuration of a driving apparatus for an AC motor according to a sixth embodiment of the present invention. A difference between the fifth embodiment and the sixth embodiment is that in the driving apparatus 102 according to the sixth embodiment, a speed pulsation suppression unit 9 which operates so as to suppress speed pulsation is used instead of the compensation torque calculation unit 8 of the driving apparatus 102 according to the fifth embodiment.

Based on the estimated angular velocity $\hat{\omega}_r$ calculated by the speed estimation apparatus 101, the speed pulsation suppression unit 9 generates a compensation torque $\tau^*_{rip}$ as a compensation torque signal which reduces speed pulsation caused by a periodic disturbance. The speed pulsation suppression unit 9 includes a speed pulsation calculator 91, a PI controller 92, a PI controller 93, and an AC restorer 94. In the sixth embodiment, compensation of speed pulsation using angular acceleration amplitudes will be described.

First, the speed pulsation calculator 91 calculates the amplitude of speed pulsation. Although the estimated speed may be subjected to Fourier series expansion as it is, the calculation is performed through the following procedure for the reason described later. In this example, speed pulsation $\omega_{rip}$ is assumed to be given by the following formula (20). When estimated angular acceleration obtained by the second angular velocity estimation unit 22 is integrated as indicated by the following formula (21), and the following formulas (20) and (21) are compared in terms of coefficients, it can be seen that a cosine coefficient $\hat{\Omega}_c$ that is a cosine component of the speed pulsation is obtained from the following formula (22), and a sine coefficient $\hat{\Omega}_s$ as a sine component thereof is obtained from the following formula (23).

[Formula 20]

$$\omega_{rip} = \Omega_c \cdot \cos(2\pi f_d t) + \Omega_s \cdot \sin(2\pi f_d t) \tag{20}$$

[Formula 21]

$$\frac{1}{s}\left(\hat{\Omega}_c \cdot \cos(2\pi f_d t) + \hat{\Omega}_s \cdot \sin(2\pi f_d t)\right) = -\frac{\hat{\Omega}_s}{2\pi f_d}\cos(2\pi f_d t) + \frac{\hat{\Omega}_c}{2\pi f_d}\sin(2\pi f_d t) \tag{21}$$

[Formula 22]

$$\hat{\Omega}_c = -\frac{\hat{\Omega}_s}{2\pi f_d} \tag{22}$$

[Formula 23]

$$\hat{\Omega}_s = \frac{\hat{\Omega}_c}{2\pi f_d} \tag{23}$$

The PI control calculations of the following formula (24) and the following formula (25) are performed so that these values become zero, and amplitudes $T_c$ and $T_s$ of the compensation torque $\tau^*_{rip}$ are determined. In the formulas, $K_{P3}$ represents a proportional gain of the speed pulsation suppression unit 9, and $K_{I3}$ represents art integral gain of the speed pulsation suppression unit 9.

[Formula 24]

$$T_c = \left(K_{P3} + \frac{K_{I3}}{s}\right) \cdot (0 - \hat{\Omega}_c) \tag{24}$$

[Formula 25]

$$T_s = \left(K_{P3} + \frac{K_{I3}}{s}\right) \cdot (0 - \hat{\Omega}_s) \tag{25}$$

When the speed pulsation $\omega_{rip}$ in the above formula (20) is differentiated, it can be seen that there is a phase difference of 90 degrees between the torque pulsation and the speed pulsation. Then, as indicated by the following formula (26), the compensation torque $\tau^*_{rip}$ is determined with advancing the phase by 90 degrees.

[Formula 26]

$$\tau^*_{rip} = -\tau_c \cdot \sin(2\pi f_d t) + T_s \cdot \cos(2\pi f_d t) \tag{26}$$

By performing such control, high-frequency speed pulsation can be reduced even in position sensorless control. Although the principle of the speed pulsation suppression is similar to that of the method of Patent Literature 1, it is difficult to combine the method of Patent Literature 1 with the principle since the high-frequency speed pulsation could not be correctly estimated in the conventional position sensorless control. Without the speed estimation apparatuses 101 according to the first to fourth embodiments, it is difficult to suppress the high-frequency speed pulsation.

In the sixth embodiment, the following measures are taken in order to enhance the effect of the speed pulsation suppression control. In Patent Literature 1, the control is performed with the speed being subjected to Fourier series expansion. However, when the estimated speed is subjected to Fourier series expansion as it is, not only a calculation amount increases but also control delay time associated with the calculation increases, thereby making it difficult to increase a control gain. Therefore, in the driving apparatus 102 according to the sixth embodiment, the speed pulsation is calculated by simple calculation equations indicated in the above formulas (22) and (23).

The calculation formula of the compensation torque $\tau^*_{rip}$ of Patent Literature 1 is expressed by the following formula (27). However in Patent Literature 1, since a phase difference between torque pulsation and speed pulsation is not taken into account, a phase margin becomes small, and consequently, it is difficult to suppress the high-frequency speed pulsation.

[Formula 27]

$$\tau^*_{rip} = T_c \cdot \cos(2\pi f_d t) + T_s \cdot \sin(2\pi f_d t) \tag{27}$$

Therefore, the driving apparatus 102 according to the sixth embodiment is configured to determine the compensation torque $\tau^*_{rip}$ in consideration of the phase difference as in the above formula (26), thereby securing the phase margin and stabilizing the speed pulsation suppression control.

Figure 12A:
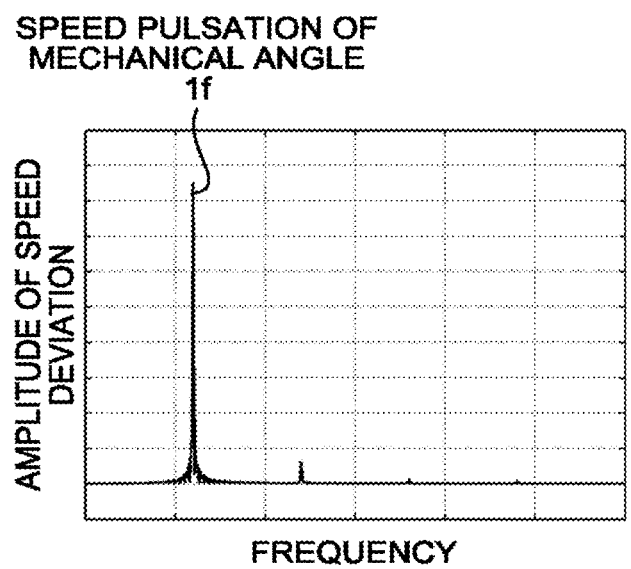
FIG. 12A is a diagram illustrating a result of a simulation by a speed control method disclosed in Patent Literature 1.
Figure 12B:
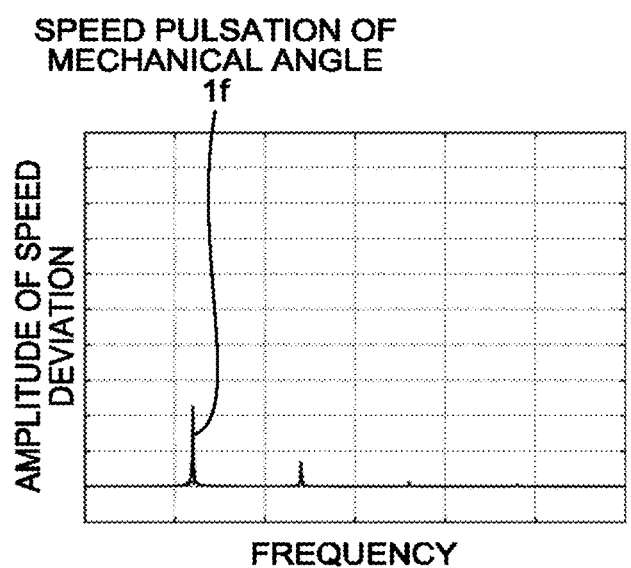
FIG. 12B is a diagram illustrating a result of a simulation by the driving apparatus for an AC motor according to the sixth embodiment of the present invention.

FIG. 12A is a diagram illustrating a result of a simulation by the speed control method disclosed in Patent Literature 1, and FIG. 12B is a diagram illustrating a result of a simulation by the driving apparatus for an AC motor according to the sixth embodiment of the present invention. In each of FIGS. 12A and 12B, the vertical axis represents the amplitude of speed deviation and the horizontal axis represents frequency. FIGS. 12A and 12B illustrate comparison of FFT results of speed pulsation when a refrigerant compressor which generates load torque pulsation of a mechanical angle 1$f$ is rotated at high speed. When the control system was designed so that the speed pulsation of the mechanical angle 1$f$ disappears, the speed pulsation of the mechanical angle 1$f$ was reduced by the control of the fifth embodiment. In FIG. 12B, the load torque pulsation of the mechanical angle 1$f$ is targeted, but the present invention is also effective against periodic disturbance of other frequencies. If it is desired to simultaneously suppress influences of multiple periodic disturbances, the speed pulsation suppression units 9 may be parallelized.

As described above, the speed estimation apparatuses 101 according to the first to fourth embodiments include the first angular velocity estimation unit 21 and the second angular acceleration estimation unit 30, and thereby high-frequency speed pulsation can be estimated with high accuracy, and the driving apparatuses 102 according to the fifth and sixth embodiments can compensate the speed pulsation without preadjustment.

Seventh Embodiment

Figure 13:
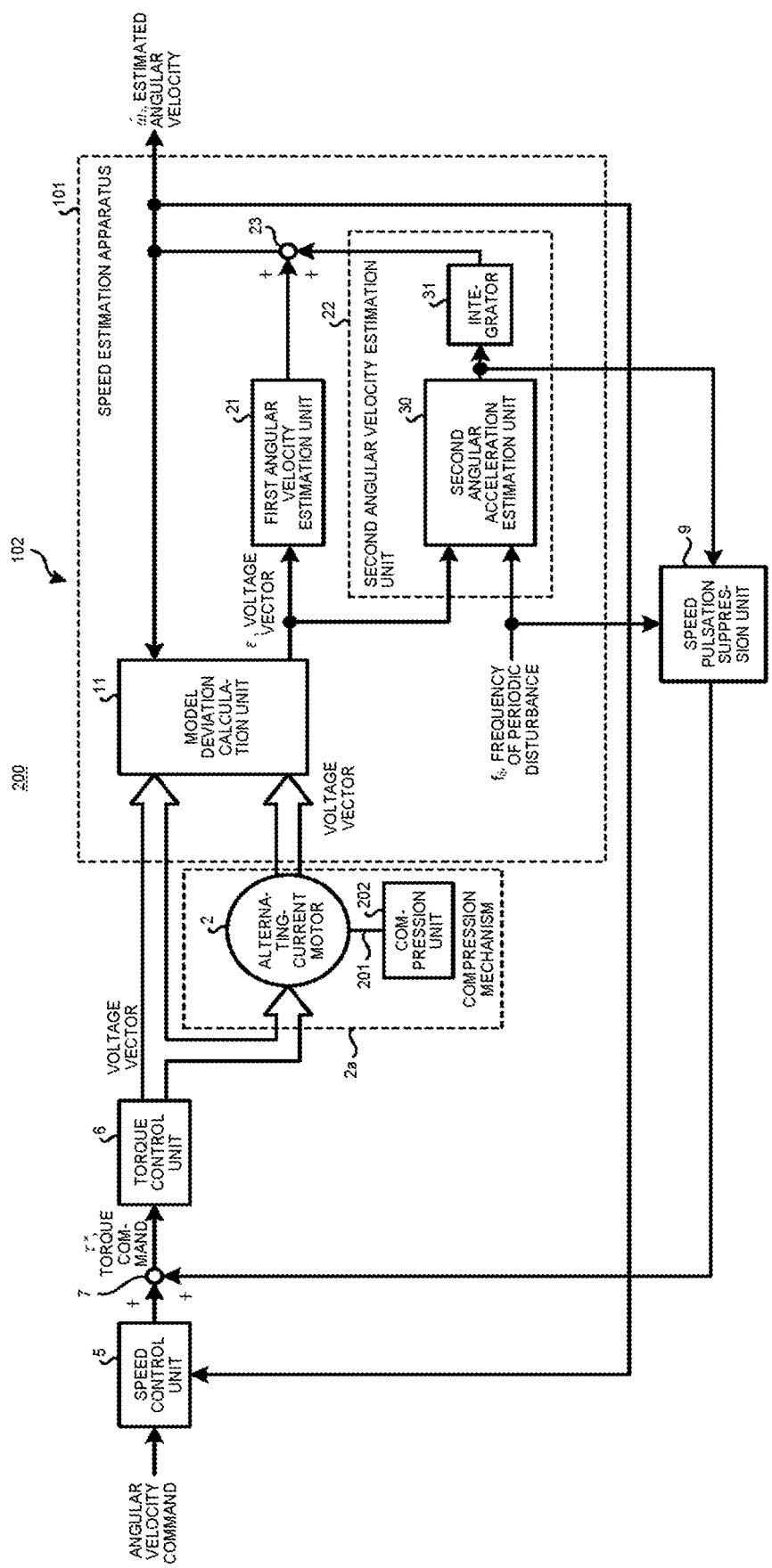
FIG. 13 is a diagram illustrating a configuration of a refrigerant compressor according to a seventh embodiment of the present invention.

FIG. 13 is a diagram illustrating a configuration of a refrigerant compressor according to a seventh embodiment of the present invention. The refrigerant compressor 200 according to the seventh embodiment includes the driving apparatus 102 according to the sixth embodiment and a compression mechanism 2a. The compression mechanism 2a illustrated in FIG. 13 includes the AC motor 2, a shaft 201, and a compression unit 202. The refrigerant compressor 200 according to the seventh embodiment includes the second angular velocity estimation unit 22 and the speed pulsation suppression unit 9 according to the sixth embodiment in order to reduce speed pulsation of the AC motor 2.

Figure 14:
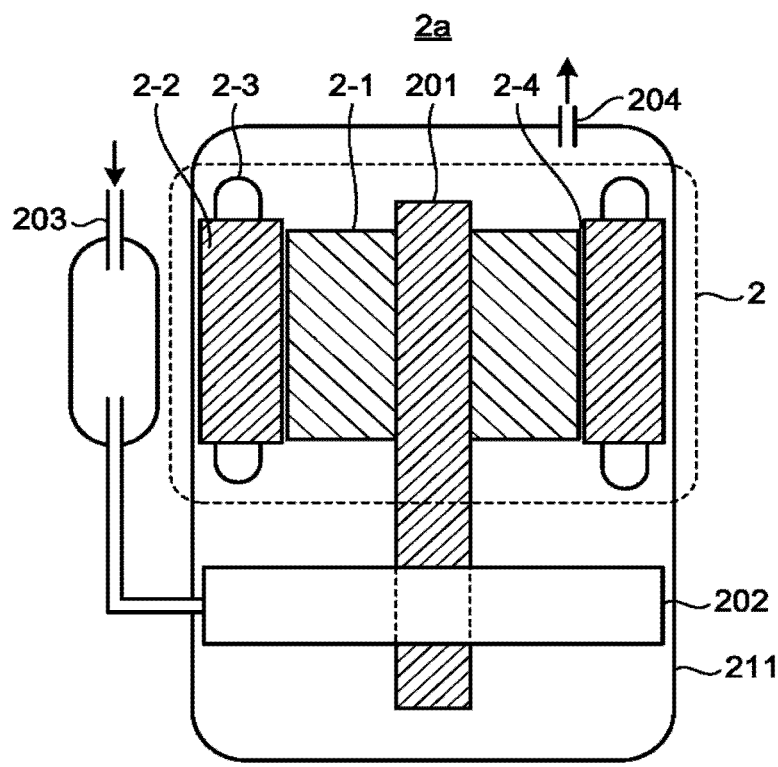
FIG. 14 is a cross-sectional view of a compression mechanism illustrated in FIG. 13.

Next, with reference to FIG. 14, a structure of the compression mechanism 2a and load torque will be specifically described.

FIG. 14 is a cross-sectional view of the compression mechanism illustrated in FIG. 13. In this example, the compression mechanism 2a of a rolling piston type will be described, but the compression mechanism 2a used for the refrigerant compressor 200 according to the seventh embodiment is not necessarily limited to the rolling piston type but may be a scroll system compressor.

The compression mechanism 2a includes a sealed container 211, the AC motor 2, the shaft 201, the compression unit 202, a suction pipe 203, and a discharge pipe 204. The AC motor 2 is provided inside the sealed container 211. One end of the shaft 201 penetrates a rotor 2-1 constituting the AC motor 2. The compression unit 202 is penetrated by the other end of the shaft 201 and is fixed to the inside of the sealed container 211. The suction pipe 203 is provided to the sealed container 211. The discharge pipe 204 is provided to the sealed container 211.

Another stator 2-2 of the AC motor 2 is attached and held in the sealed container 211 by shrinkage fitting, cold fitting, or welding. Electric power is supplied to a coil 2-3 of the stator 2-2 via an electric wire (not illustrated). The rotor 2-1 is disposed inside the stator 2-2 via a gap 2-4 and is held rotatably by a bearing (not illustrated) via the shaft 201 situated at the center of the rotor 2-1.

By drive of the AC motor 2 in the compression mechanism 2a configured as described above, a refrigerant sucked into the compression unit 202 via the suction pipe 203 is compressed, and the compressed refrigerant is discharged from the discharge pipe 204. The compression mechanism 2a often uses a structure in which the AC motor 2 is immersed in the refrigerant, and so temperature may change drastically. For this reason, it is difficult to attach a position sensor to the AC motor 2. Therefore, in the refrigerant compressor 200, the AC motor 2 has to be position-sensorlessly driven.

Figure 15:
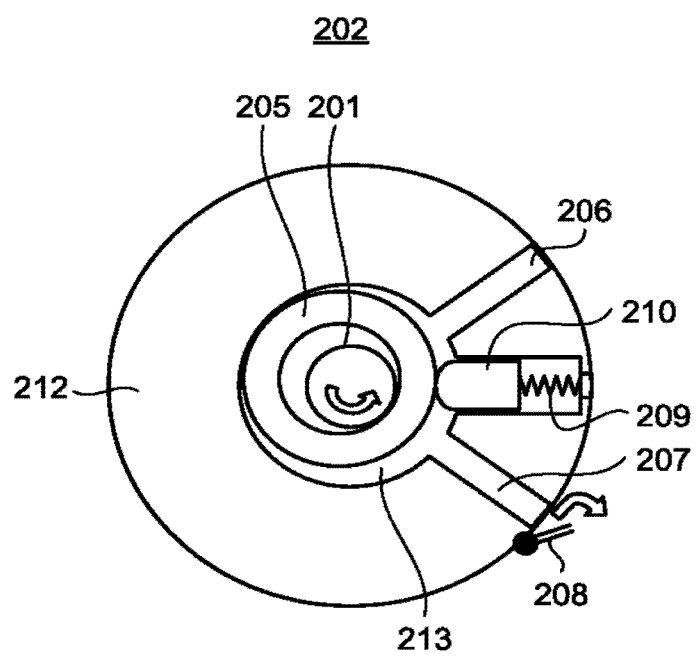
FIG. 15 is a view illustrating a configuration of a compression unit illustrated in FIG. 13.

FIG. 15 is a view illustrating a configuration of the compression unit illustrated in FIG. 13. The compression unit 202 includes an annular cylinder 212, a piston 205, and a compression chamber 213. The piston 205 is formed to be rotatable integrally with the shaft 201, and is disposed inside the cylinder 212. The compression chamber 213 is provided to an inner circumferential portion of the cylinder 212.

The cylinder 212 has a suction port 206 and a discharge port 207. The suction port 206 communicates with the suction pipe 203 illustrated in FIG. 14. Through the discharge port 207, the compressed refrigerant is discharged. The suction port 206 and the discharge port 207 communicate with the compression chamber 213. The cylinder 212 further includes a vane 210 and a spring 209. The vane 210 divides the compression chamber 213 into a low-pressure chamber communicating with the suction pipe 203 and a high-pressure chamber communicating with the discharge port 207. The spring 209 biases the vane 210.

The shaft 201 connects the AC motor 2 and the piston 205 to each other. The piston 205 is eccentric so that the volumes of a discharge side and a suction side change depending on a rotation angle. The refrigerant sucked through the suction port 206 is compressed by the piston 205, and when the pressure in the compression chamber 213 increases, a discharge valve 208 opens and the refrigerant is discharged from the discharge port 207. At the same time as the discharge of the refrigerant, refrigerant flows into the suction side. When the AC motor 2 is continued to be operated, the refrigerant is discharged once per mechanical angle rotation of the piston 205.

Figure 16:
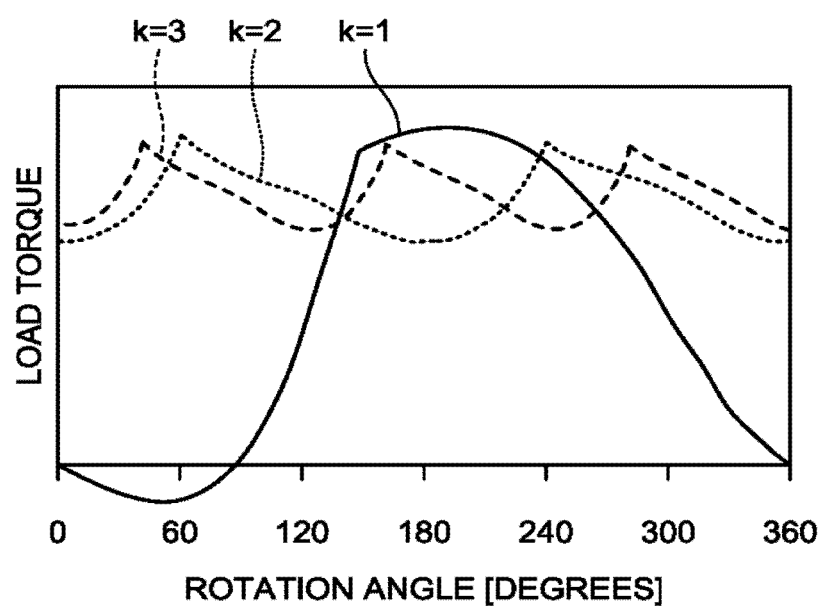
FIG. 16 is a diagram illustrating a waveform of load torque in a rolling piston compression mechanism illustrated in FIG. 15.

FIG. 16 is a diagram illustrating a waveform of load torque in the rolling piston system compression mechanism illustrated in FIG. 15. In FIG. 16, the vertical axis represents load torque and the horizontal axis represents rotation angle as mechanical angle of the piston 205. FIG. 16 illustrates variations of the load torque with respect to the mechanical angle of the piston 205. Although one compression chamber 213 is illustrated in FIG. 15, two or more compression chambers 213 may be provided in the cylinder 212. Here, the number of compression chambers 213 is denoted by k. When k=1, that is, when the number of compression chambers 213 is one, the load torque greatly vibrates at a mechanical angle cycle. Secondary and tertiary harmonics are also included in the load torque waveform, but primary vibration is the largest.

In a case of providing a plurality of compression chambers 213, load torque pulsation can be reduced by disposing the chambers with shifting an angle of the piston 205. As the number of the compression chambers 213 increases, a waveform with less pulsation can be obtained, but the structure becomes complicated and cost increases. The cycle of the load torque pulsation is shortened in inverse proportion to the number of compression chambers 213. When k=2, that is, when the number of compression chambers 213 is two, a secondary harmonic component is large in the load torque, and when k=3, that is, when the number of compression chambers 213 is three, a tertiary harmonic component is large in the load torque.

The load torque pulsation of the compression mechanism 2a becomes a periodic disturbance to the AC motor 2, and therefore is a factor of speed pulsation. It is generally known in the compression mechanism 2a that when the speed pulsation is large, noise and vibration increase.

However, the frequencies of the load torque pulsation and the speed pulsation are determined by the structure of the compression mechanism 2a, and therefore are known. The refrigerant compressor 200 according to the seventh embodiment is adapted to this fact and accordingly configured to construct a control system illustrated in FIG. 13. The refrigerant compressor 200 uses the second angular velocity estimation unit 22 to estimate a specific frequency component of the speed pulsation with high accuracy, and uses the speed pulsation suppression unit 9 to calculate a compensation torque $\tau^*_{rip}$ such that its pulsation is suppressed. This makes it possible to reduce the speed pulsation without performing preadjustment. By eliminating the need for the preadjustment, adjustment cost before shipping can be greatly reduced, and extreme usefulness is achieved.

In the seventh embodiment, the configuration example of the refrigerant compressor 200 using the driving apparatus 102 according to the sixth embodiment and the compression mechanism 2a has been described. However, the refrigerant compressor 200 according to the seventh embodiment may use, instead of the above, the second angular velocity estimation unit 22 and the compensation torque calculation unit 8 according to the fifth embodiment, and a similar effect can be obtained also in a case of such a configuration.

Eighth Embodiment

Figure 17:
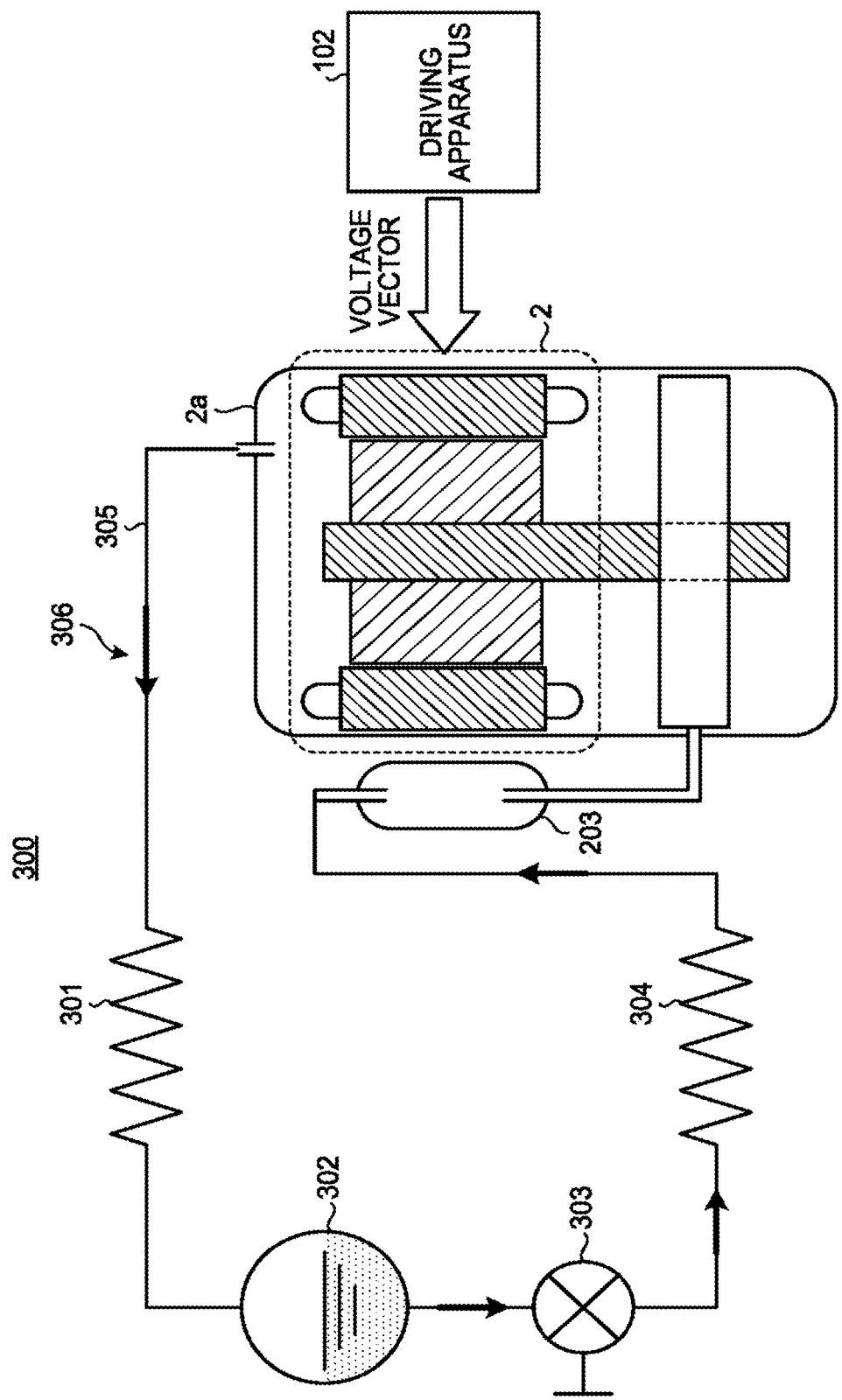
FIG. 17 is a diagram illustrating a configuration of a refrigeration cycle apparatus according to an eighth embodiment of the present invention.

FIG. 17 is a diagram illustrating a configuration of a refrigeration cycle apparatus according to an eighth embodiment of the present invention. The refrigeration cycle apparatus 300 illustrated in FIG. 17 includes the driving apparatus 102 for an AC motor, the compression mechanism 2a, a condenser 301, a liquid receiver 302, an expansion valve 303, and an evaporator 304. The condenser 301 is connected to the compression mechanism 2a via a pipe 305. The liquid receiver 302 is connected to the condenser 301 via the pipe 305. The expansion valve 303 is connected to the liquid receiver 302 via the pipe 305. The evaporator 304 is connected to the expansion valve 303 via the pipe 305. The evaporator 304 is connected to the suction pipe 203.

The compression mechanism 2a, the condenser 301, the liquid receiver 302, the expansion valve 303, the evaporator 304, and the suction pipe 203 are connected by the pipe 305, and thereby the compression mechanism 2a, the condenser 301, the liquid receiver 302, the expansion valve 303, the evaporator 304, and the suction pipe 203 constitute a refrigeration cycle circuit 306 in which a refrigerant circulates. In the refrigeration cycle circuit 306, the processes of evaporating, compressing, condensing, and expanding the refrigerant are repeated, and heat transmission is performed while the refrigerant repeats changes from liquid to gas or from gas to liquid.

The function of each of devices constituting the refrigeration cycle apparatus 300 will be described. The evaporator 304 evaporates a refrigerant liquid in a low-pressure state to take heat away from surroundings, and has a cooling effect. The compression mechanism 2a compresses a refrigerant gas into a high-pressure gas in order to condense the refrigerant. The compression mechanism 2a is driven by the driving apparatus 102 according to the fourth or fifth embodiment. The condenser 301 discharges heat to condense the high-pressure refrigerant gas into a refrigerant liquid. The expansion valve 303 throttles and expands the refrigerant liquid into a low-pressure liquid in order to evaporate the refrigerant. The liquid receiver 302 is provided for adjusting the amount of a circulating refrigerant and may be omitted in a small-sized apparatus.

Regarding refrigeration cycle apparatuses, in general, there are demands for improvement in quietness and reduction in cost. In domestic refrigeration cycle apparatuses, demands for cost reduction are particularly strong, and so single rotary compressors are often used. The single rotary compressor is the rotary compressor described with reference to FIGS. 14 and 15, and is the type of compressor having only one compression chamber 213. Since the load torque pulsation of rotary compressors is very large, vibration and noise tend to be large. On the other hand, as described above, complicated control adjustment has been required for suppression of vibration and noise in the conventional feedforward control method.

In the refrigeration cycle apparatus 300 according to the eighth embodiment, since the driving apparatus 102 performs feedback control so as to automatically force the speed pulsation to be zero, the cost for the adjustment before shipment can be remarkably reduced. Furthermore, according to the eighth embodiment, the speed pulsation is suppressed by the feedback control, thereby making it possible to flexibly cope with manufacturing variations, motor constant variations, and changes in a load condition of the compressor. Accordingly, the refrigeration cycle apparatus 300 with high environment resistance can be achieved.

The configuration described in each embodiment above shows one example of the content of the present invention and can be combined with other publicly known techniques, and a part thereof can be omitted and/or modified without departing from the gist of the present invention.

REFERENCE SIGNS LIST

2 AC motor; 2-1 rotor; 2-2 stator; 2-3 coil; 2-4 gap; 2a compression mechanism; 3 voltage application unit; 4 current detection unit; 5 speed control unit; 6 torque control unit; 7, 23, 35 adder; 8 compensation torque calculation unit; 9 speed pulsation suppression unit; 11 model deviation calculation unit; 12 current estimator; 13 subtractor; 14 deviation calculator; 21, 21A first angular velocity estimation unit; 22, 22A second angular velocity estimation unit; 24, 27, 28, 92, 93 PI controller; 25, 31 integrator; 26 Fourier coefficient calculator; 29 AC restorer; 30 second angular acceleration estimation unit; 32 suppression frequency determination unit; 33 third angular velocity estimation unit; 34 angular velocity estimation unit; 91 speed pulsation calculator; 94 AC restorer; 101, 101A speed estimation apparatus; 102 driving apparatus; 200 refrigerant compressor; 201 shaft; 202 compression unit; 203 suction pipe; 204 discharge pipe; 205 piston; 206 suction port; 207 discharge port; 208 discharge valve; 209 spring; 210 vane; 211 sealed container; 212 cylinder; 213 compression chamber; 300 refrigeration cycle apparatus; 301 condenser; 302 liquid receiver; 303 expansion valve; 304 evaporator; 305 pipe; 306 refrigeration cycle circuit; 901 processor; 902 memory.

The invention claimed is:

1. A speed estimation apparatus for an AC motor, comprising:
    a model deviation calculation unit to calculate a model deviation based on a voltage, a current, and an estimated angular velocity of an AC motor;
    a first angular velocity estimation unit to calculate a first estimated angular velocity as a low-frequency component including a DC component of a real angular velocity based on the model deviation, the first angular velocity estimation unit having a first transfer function with maximum values in a first frequency range;
    a second angular velocity estimation unit to calculate a second estimated angular velocity as a high-frequency component of a real angular velocity based on a specific high-frequency component included in the model deviation, the second angular velocity estimating unit having a second transfer function with a peak in the specific high-frequency component, the specific high-frequency component being in a second frequency range non-overlapping with the first frequency range; and
    an adder to add the first estimated angular velocity and the second estimated angular velocity together to produce a sum of the first estimated angular velocity and the second estimated angular velocity such that the low-frequency component including the DC component and the high-frequency component are added, wherein
    the sum of the first estimated angular velocity and the second estimated angular velocity is fed back as the estimated angular velocity to the model deviation calculation unit.

2. The speed estimation apparatus for an AC motor according to claim 1, wherein the second angular velocity estimation unit comprises:
a frequency analyzer to convert a specific high-frequency component included in the model deviation into a DC component and to extract the specific high-frequency component;
an angular velocity auxiliary calculator to estimate a pulsatile component of an angular velocity based on the high-frequency component extracted by the frequency analyzer; and
an AC restorer to convert an output of the angular velocity auxiliary calculator back to an AC component.

3. The speed estimation apparatus for an AC motor according to claim 1, wherein the high-frequency component is a pulsatile component due to a periodic disturbance.

4. The speed estimation apparatus for an AC motor according to claim 1, comprising a suppression frequency determination unit to determine a frequency of a periodic disturbance to be suppressed, wherein
the suppression frequency determination unit determines a suppression frequency by multiplying an estimated angular velocity by a ratio between an angular velocity of an AC motor and a frequency of a periodic disturbance.

5. The speed estimation apparatus for an AC motor according to claim 1, comprising n (n is a natural number of 2 or more) angular velocity estimation units each corresponding to the second angular velocity estimation unit, wherein
the adder adds outputs of the n angular velocity estimation units,
each of the angular velocity estimation units each corresponding to the second angular velocity estimation unit estimates an angular velocity of the AC motor based on high-frequency components of their respective different frequencies, and
a sum of an output of the first angular velocity estimation unit and outputs of the n angular velocity estimation units is fed back as the estimated angular velocity to the model deviation calculation unit.

6. The speed estimation apparatus for an AC motor according to claim 2, wherein
the second angular velocity estimation unit comprises two PI controllers as the angular velocity auxiliary calculator,
the frequency analyzer separately analyzes a cosine component and a sine component of the high-frequency component,
the two PI controllers PI-control the cosine component and the sine component separately analyzed by the frequency analyzer, respectively, to calculate a cosine component and a sine component of an estimated angular velocity, and
the AC restorer obtains a high-frequency component of an estimated angular velocity by multiplying the cosine component and the sine component of the estimated angular velocity by a cosine wave and a sine wave, respectively, and adding products thereof together.

7. The speed estimation apparatus for an AC motor according to claim 2, wherein
the second angular velocity estimation unit comprises two PI controllers and an integrator as the angular velocity auxiliary calculator,
the frequency analyzer separately analyzes a cosine component and a sine component of the high-frequency component,
the two PI controllers PI-control the cosine component and the sine component separately analyzed by the frequency analyzer, respectively, to calculate a cosine component and a sine component of an estimated angular acceleration,
the AC restorer obtains a high-frequency component of an estimated acceleration by multiplying the cosine component and the sine component of the estimated angular acceleration by a cosine wave and a sine wave, respectively, and adding products thereof together, and
the integrator integrates the high-frequency component of the estimated angular acceleration to obtain a high-frequency component of an estimated angular velocity.

8. A driving apparatus for an AC motor, the apparatus comprising:
the speed estimation apparatus for an AC motor according to claim 1;
a voltage application unit to apply a voltage to the AC motor; and
a current detection unit to detect a current flowing through the AC motor, wherein
a voltage to be applied to the AC motor is determined from an estimated angular velocity estimated by the speed estimation apparatus and a current flowing through the AC motor.

9. A driving apparatus for an AC motor, the apparatus comprising:
the speed estimation apparatus for an AC motor according to claim 7;
a voltage application unit to apply a voltage to the AC motor;
a current detection unit to detect a current flowing through the AC motor; and
a compensation torque calculation unit to generate a compensation torque signal that reduces speed pulsation caused by a periodic disturbance, wherein
the compensation torque calculation unit determines a compensation torque based on a high-frequency component, or a cosine component and a sine component of the estimated angular velocity or the estimated angular acceleration calculated by the angular velocity auxiliary calculator.

10. A driving apparatus for an AC motor, the apparatus comprising:
the speed estimation apparatus for an AC motor according to claim 7;
a voltage application unit to apply a voltage to the AC motor;
a current detection unit to detect a current flowing through the AC motor; and
a compensation torque calculation unit to generate a compensation torque signal that reduces speed pulsation caused by a periodic disturbance, wherein
the compensation torque calculation unit estimates a disturbance torque based on any of a torque generated by the AC motor, a high-frequency component, or a cosine component and a sine component of the estimated angular velocity and the estimated angular acceleration calculated by the speed estimation apparatus for the AC motor, and generates a compensation torque signal from the estimated disturbance torque.

11. The driving apparatus for an AC motor according to claim 9, wherein
the periodic disturbance is load torque pulsation of a mechanical load device connected to the AC motor, and
the compensation torque calculation unit suppresses speed pulsation caused by the load torque pulsation.

12. The driving apparatus for an AC motor according to claim 9, wherein the periodic disturbance is torque ripple generated due to a deadtime of the voltage application unit, and the compensation torque calculation unit suppresses speed pulsation caused by the torque ripple.

13. The driving apparatus for an AC motor according to claim 9, wherein the periodic disturbance is torque ripple due to distortion of an induced voltage of the AC motor, and the compensation torque calculation unit suppresses speed pulsation caused by the torque ripple.

14. The driving apparatus for an AC motor according to claim 9, wherein the periodic disturbance is torque ripple due to an offset error of the current detection unit, and the compensation torque calculation unit suppresses speed pulsation caused by the torque ripple.

15. The driving apparatus for an AC motor according to claim 9, wherein the periodic disturbance is torque ripple due to a current detection gain error of the current detection unit, and the compensation torque calculation unit suppresses speed pulsation caused by the torque ripple.

16. A refrigerant compressor comprising:

the driving apparatus for an AC motor according to claim 8;

an AC motor to which a voltage is applied by the driving apparatus for an AC motor; and a compression unit to compress a refrigerant with the AC motor.

17. A refrigeration cycle apparatus comprising the refrigerant compressor according to claim 16, a condenser, an evaporator, and an expansion valve.

* * * * *